US007871329B2

(12) United States Patent
Rowe

(10) Patent No.: US 7,871,329 B2
(45) **Date of Patent: *Jan. 18, 2011**

(54) CASINO GAMBLING SYSTEM WITH BIOMETRIC ACCESS CONTROL

(75) Inventor: Richard E. Rowe, Incline Village, NV (US)

(73) Assignee: IGT, Reno, NV (US)

( * ) Notice: Subject to any disclaimer, the term of this patent is extended or adjusted under 35 U.S.C. 154(b) by 419 days.

This patent is subject to a terminal disclaimer.

(21) Appl. No.: 11/585,019

(22) Filed: Oct. 23, 2006

(65) Prior Publication Data

US 2007/0060334 A1 Mar. 15, 2007

Related U.S. Application Data

(63) Continuation of application No. 09/733,490, filed on Dec. 8, 2000, now Pat. No. 7,125,335.

(51) Int. Cl.
*G06F 17/00* (2006.01)
*G06F 19/00* (2006.01)

(52) U.S. Cl. .............................. 463/29; 463/25; 463/40; 463/41; 463/42; 382/115; 382/116; 382/124

(58) Field of Classification Search ................... 463/25, 463/29, 40–42; 382/115, 116, 124, 168–172
See application file for complete search history.

(56) References Cited

U.S. PATENT DOCUMENTS 4,792,226 A * 12/1988 Fishbine et al. ............... 356/71
4,811,414 A * 3/1989 Fishbine et al. ............. 382/272
4,933,976 A * 6/1990 Fishbine et al. ............. 382/127
5,056,141 A 10/1991 Dyke
5,265,874 A 11/1993 Dickinson et al.
5,326,104 A 7/1994 Pease et al.

(Continued)

FOREIGN PATENT DOCUMENTS

DE 19610 066 9/1997

(Continued)

OTHER PUBLICATIONS

"EZ Pay System" (shown in Fig. 1 and described on pp. 1-2 of application).

(Continued)

*Primary Examiner*—Peter DungBa Vo
*Assistant Examiner*—Milap Shah
(74) *Attorney, Agent, or Firm*—Weaver Austin Villeneuve & Sampson LLP

(57) ABSTRACT

A casino gambling system may comprise a plurality of casino gambling units and at least one computer that may include a biometric input apparatus capable of generating digital data representing a unique physical characteristic of a user and a controller operatively coupled to the biometric input apparatus. The controller may be programmed to control access to the computer based upon digital data generated by the biometric input apparatus. The biometric input apparatus may be a camera for generating an image of a person's face, an eye scanner, a fingerprint scanner, or a microphone and a voice digitizer. The gambling units may be programmed to play a game selected from the group of video games consisting of video poker, video blackjack, video slots, video keno and video poker.

17 Claims, 18 Drawing Sheets

U.S. PATENT DOCUMENTS

| | | | | |
|---|---|---|---|---|
| 5,332,968 | A * | 7/1994 | Brown | 324/309 |
| 5,414,529 | A * | 5/1995 | Terada et al. | 358/448 |
| 5,505,449 | A | 4/1996 | Eberhardt et al. | |
| 5,615,277 | A | 3/1997 | Hoffman | |
| 5,764,789 | A | 6/1998 | Pare et al. | |
| 5,766,076 | A | 6/1998 | Pease et al. | |
| 5,768,382 | A | 6/1998 | Schneier et al. | |
| 5,833,536 | A | 11/1998 | Davids et al. | |
| 5,851,148 | A | 12/1998 | Brune et al. | |
| 5,871,398 | A | 2/1999 | Schneier et al. | |
| 5,878,211 | A | 3/1999 | Delagrange et al. | |
| 5,902,983 | A | 5/1999 | Crevelt et al. | |
| 5,926,555 | A * | 7/1999 | Ort et al. | 382/124 |
| 5,951,397 | A | 9/1999 | Dickinson | |
| 5,954,583 | A | 9/1999 | Green | |
| 5,970,143 | A | 10/1999 | Schneier et al. | |
| 5,995,630 | A | 11/1999 | Borza | |
| 6,014,165 | A * | 1/2000 | McIntyre et al. | 348/64 |
| 6,027,115 | A | 2/2000 | Griswold et al. | |
| 6,048,269 | A | 4/2000 | Burns et al. | |
| 6,072,891 | A * | 6/2000 | Hamid et al. | 382/116 |
| 6,099,408 | A | 8/2000 | Schneier et al. | |
| 6,135,884 | A | 10/2000 | Hedrick et al. | |
| 6,148,094 | A | 11/2000 | Kinsella | |
| 6,178,255 | B1 | 1/2001 | Scott et al. | |
| 6,181,803 | B1 * | 1/2001 | Davis | 382/115 |
| 6,193,153 | B1 | 2/2001 | Lambert | |
| 6,325,292 | B1 | 12/2001 | Sehr | |
| 6,393,139 | B1 * | 5/2002 | Lin et al. | 382/124 |
| 6,483,932 | B1 * | 11/2002 | Martinez et al. | 382/124 |
| 6,682,421 | B1 | 1/2004 | Rowe et al. | |
| 6,944,773 | B1 * | 9/2005 | Abrahams | 713/168 |
| 7,007,298 | B1 * | 2/2006 | Shinzaki et al. | 726/3 |
| 7,125,335 | B2 * | 10/2006 | Rowe | 463/25 |
| 2002/0091937 | A1 * | 7/2002 | Ortiz | 713/200 |
| 2002/0099665 | A1 * | 7/2002 | Burger et al. | 705/67 |

FOREIGN PATENT DOCUMENTS

| | | |
|---|---|---|
| DE | 19610066 | 9/1997 |
| WO | WO 96/41297 | 12/1996 |
| WO | WO 97/34251 | 9/1997 |
| WO | WO 99/19027 | 4/1999 |
| WO | WO9960483 | 11/1999 |

OTHER PUBLICATIONS

Communication from European Patent Office, dated Nov. 9, 2006 (5 pages).
European Examination Report dated Mar. 20, 2006, for related European Application No. 01 995 406.4. [IGT1P503EP].
European Examination Report dated Jun. 22, 2007, for related European Application No. 01 995 406.4. [IGT1P503EP].
Summons to attend Oran Proceedings dated Mar. 18, 2008, for related European Application No. 01 995 406.4. [IGT1P503EP].
Decision To Refuse A European Patent Application dated Jan. 12, 2009, for related European Application No. 01 995 406.4. [IGT1P503EP].

* cited by examiner

CASINO GAMBLING SYSTEM WITH BIOMETRIC ACCESS CONTROL

BACKGROUND OF THE INVENTION

This invention relates to a casino gambling system that includes a plurality of casino gambling units that allow customers to play casino gambling games such as poker and blackjack.

FIG. 1 illustrates a prior art casino gambling system 10 that was commercially utilized more than one year prior to the filing date of this patent by International Game Technology, the assignee of this patent. Referring to FIG. 1, the prior art system 10, a portion of which is referred to as the "EZ Pay" system, included a plurality of gambling units 12, which were provided in the form of conventional gambling machines, such as machines that allowed casino customers to play casino games such as video poker, video blackjack, video slots, etc.

The gambling units 12 utilized ticket vouchers that were used as a medium of value and that could be exchanged for cash after being validated. For example, in the case where a gambling unit 12 was a slot machine, instead of dispensing winnings in the form of coins, the slot machine would issue a ticket voucher, which was generated by a ticket printer disposed in the slot machine. Various types of ticket vouchers were used. For example, ticket vouchers were utilized as cash vouchers, which could be redeemed for cash, or as gaming vouchers, which could be utilized to make wagers while using the gambling units 12.

Before being redeemed or cashed by a casino customer, a ticket voucher needed to be validated. The ticket voucher could be validated by inserting it into one of a plurality of clerk validation terminals (CVT) 14, with each of the CVTs 14 being operatively connected to a group of gambling units 12. The validation was performed by comparing information read from the ticket voucher with information stored in the CVT 14, which information could be transmitted to the CVT 14 from the gambling units 12 to which it was operatively coupled. After a ticket voucher was cashed out, the CVT 14 stored in its memory information identifying the paid ticket voucher to prevent a ticket voucher from being cashed more than once. Such validation process could only be performed by the CVT 14 operatively coupled to the gambling unit 12 which issued the ticket voucher.

To allow more flexibility in validating ticket vouchers, the CVTs 14 were connected to a concentrator 16, which was in turn connected to a front-end controller 18 coupled to a server computer 20. The server computer 20 was connected to a plurality of cashier computers 22 and an audit computer 24 via a networked data link 26. The connection of the front-end controller 18 and the concentrator 16 to multiple CVTs 14 allowed data regarding the ticket vouchers generated by all of the gambling units 12 to be concentrated at the server computer 20.

Due to the connection of the cashier computers 22 to the server computer 20, customers could also present ticket vouchers to cashiers for validation and redemption. In that case, the cashier to whom a ticket voucher was presented would insert the ticket voucher into a cashier computer 22, and the computer 22 would validate the ticket voucher by comparing data optically read from the ticket voucher with data retrieved from the gambling unit 12 that issued the ticket voucher. After validation of a ticket voucher, validation information was transmitted to the audit computer 24, which performed various audit operations. The server computer 20 was also connected to an administration computer 28 and an accounting computer 30 for other functions to be performed.

Before a cashier was allowed to use a cashier computer 22 to perform ticket validation and other functions, the cashier was required to logon to the cashier computer 22 by entering a user identification number and a password for security purposes. Some operations performed by the cashier using the cashier computer 22 required the authority of a supervisor, in which case the supervisor needed to enter a password before the operations could be performed.

SUMMARY OF THE INVENTION

The invention is directed to a casino gambling system that may comprise a first computer, a plurality of casino gambling units operatively coupled to the first computer, and a second computer operatively coupled to the first computer. The second computer may include a biometric input apparatus capable of generating digital data representing a unique physical characteristic of a user and a controller operatively coupled to the biometric input apparatus. The controller may have a microprocessor and a memory and may be programmed to control access to the second computer based upon digital data generated by the biometric input apparatus. The biometric input apparatus may be a camera for generating an image of a person's face, an eye scanner, a fingerprint scanner, or a microphone and a voice digitizer.

One or more of the casino gambling units may be provided with a display unit that is capable of generating color images, an input device that allows a player to make an input selection, a value-input device that is capable of allowing the player to deposit a medium of value, and a gambling unit controller operatively coupled to the display unit, the input device, and the value-input device. The gambling unit controller may include a processor and a memory operatively coupled to the processor. The gambling unit controller may be programmed to allow the player to make a wager; the gambling unit controller may be programmed to cause a video image relating to a video gambling game to be generated on the display unit; and the gambling unit controller may be programmed to determine, after the image has been displayed, an outcome of the video gambling game and a value payout associated with the outcome of the video gambling game. The gambling units may be programmed to play a video game selected from the group of video games consisting of video poker, video blackjack, video slots, video keno and video poker.

The controller of the second computer may be programmed to store a plurality of sets of digital data, each of the sets of digital data being derived from the biometric input apparatus and each of the sets of digital data corresponding to a unique physical characteristic of a person. The controller may be programmed to generate a set of composite digital data based on the plurality of sets of digital data. The controller may also be programmed to compare a set of digital data representing a unique physical characteristic of a person attempting to use the second computer with the set of composite digital data to determine whether the person attempting to use the second computer should be allowed to use the second computer.

The controller of the second computer may be programmed with an employee enrollment routine that allows the controller to store digital data representing a unique physical characteristic of an employee, and the controller may be programmed with an access-control routine that allows the controller to limit use of the second computer to an employee for which digital data representing a unique physical characteristic of the employee has been previously stored by the enrollment routine.

The features and advantages of the present invention will be apparent to those of ordinary skill in the art in view of the detailed description of various embodiments, which is made with reference to the drawings, a brief description of which is provided below.

DETAILED DESCRIPTION OF VARIOUS EMBODIMENTS

Figure 1:
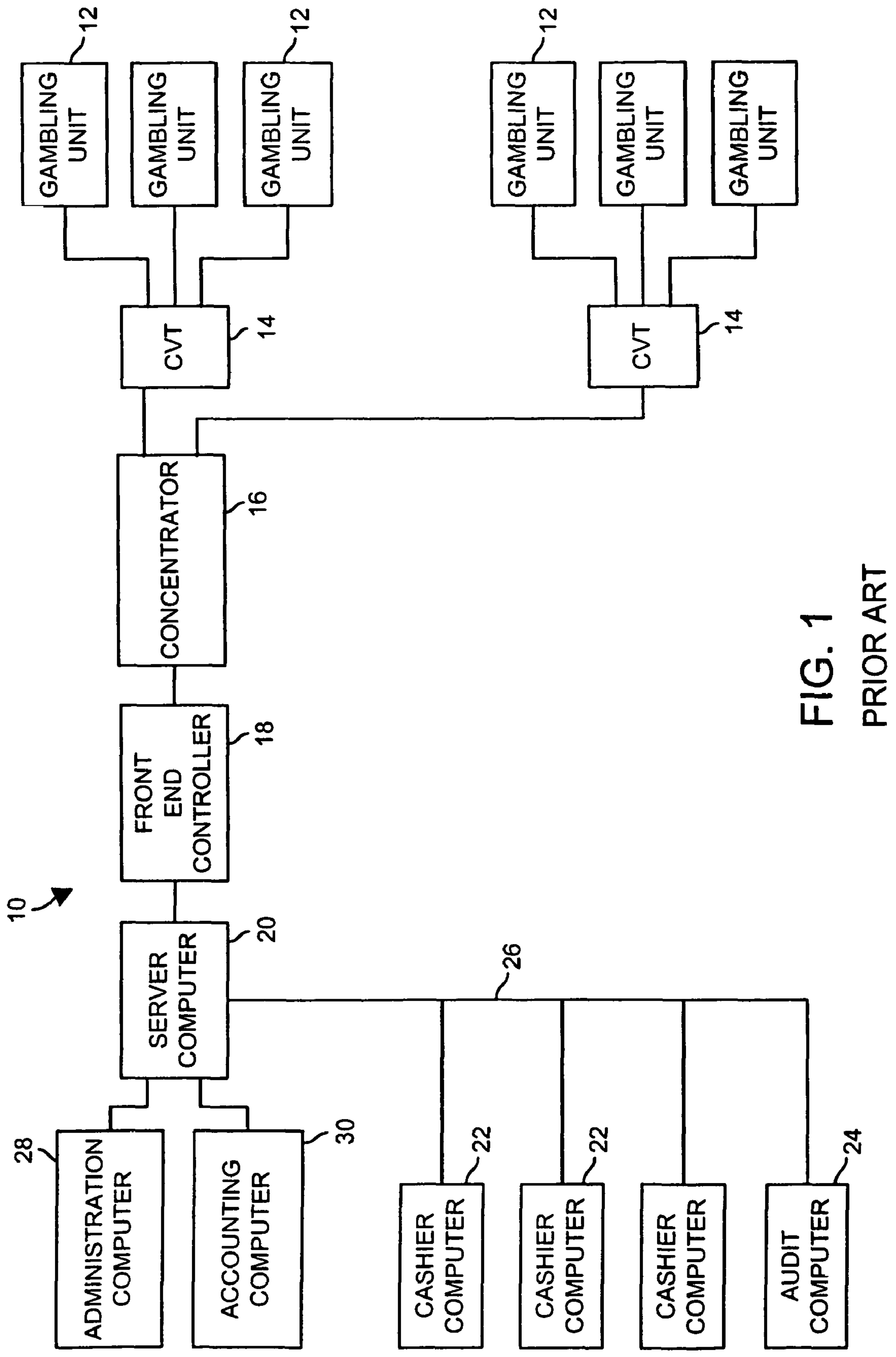
FIG. 1 PRIOR ART
FIG. 1 is a block diagram of a prior art casino gambling system.
Figure 2:
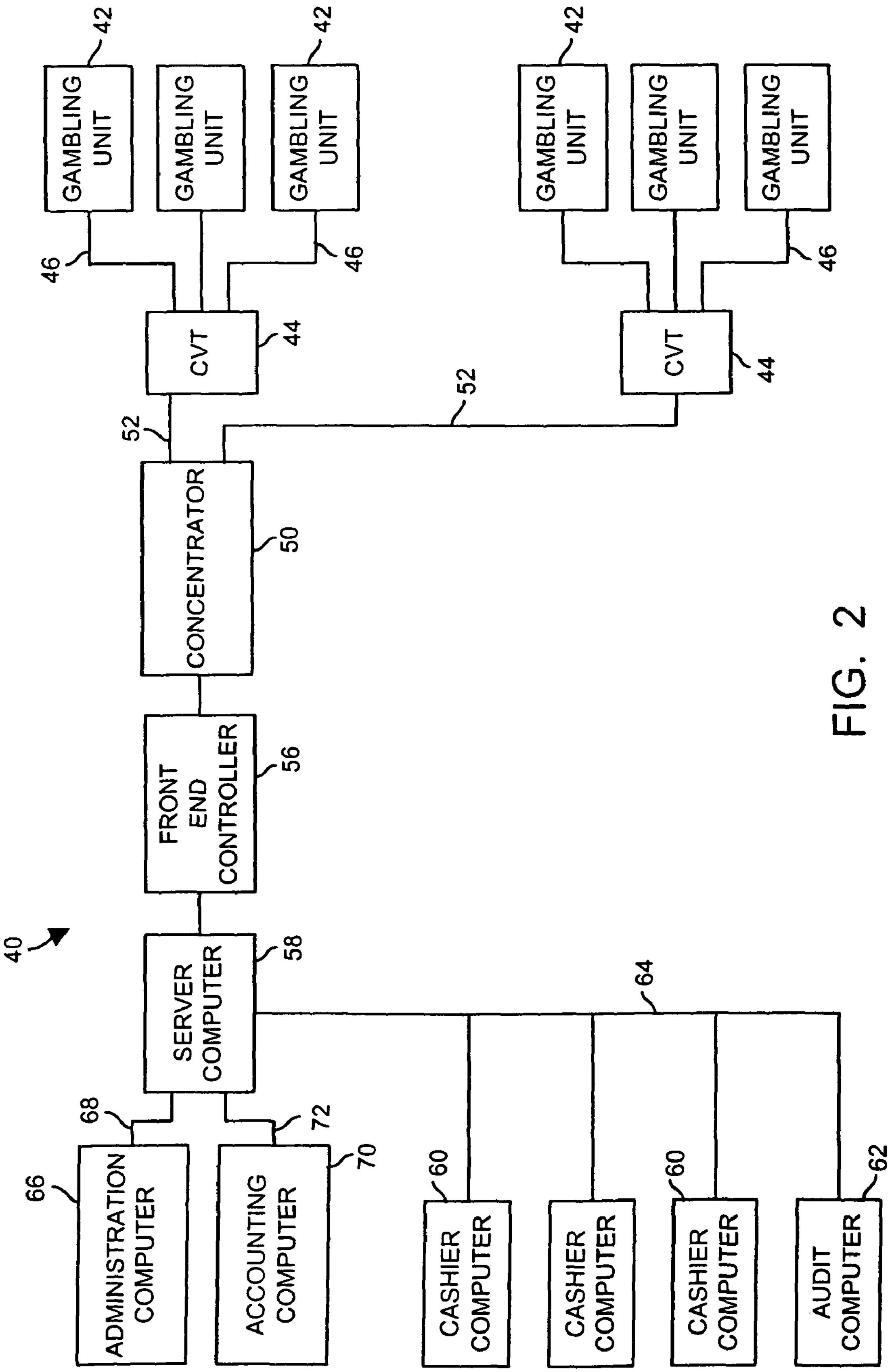
FIG. 2 is a block diagram of an embodiment of a casino gambling system in accordance with the invention.

One embodiment of a casino gambling system 40 in accordance with the invention is shown in FIG. 2. Referring to FIG. 2, the casino gambling system 40 may include a plurality of gambling units 42, each of which is operatively coupled to a first clerk validation terminal (CVT) 44 via a respective data link 46, and a plurality of gambling units 42, each of which is operatively coupled to a second CVT 44 via a respective data link 46. Although FIG. 2 illustrates a data link 46 directly linking each of the gambling units 42 to one of the CVTs 44, the gambling units 42 may be operatively coupled to the CVTs 44 in other ways, such as via one or more buses or one or more daisy-chained circular data links, and the particular manner of interconnection is not considered important to the invention. Although FIG. 2 illustrates only six gambling units 42 and two CVTs 44, it should be understood that the system 40 could include more gambling units 42 and CVTs 44.

Data regarding ticket vouchers printed by each of the gambling units 42, such as a voucher type, a voucher number, a voucher date, a voucher amount, and a gambling unit identification number that issued the voucher, may be transferred from each of the gambling units 42 to the CVTs 44 periodically or when a ticket voucher is generated by one of the gambling units 42. Other types of voucher data could be utilized.

Each of the CVTs 44 may be operatively coupled to a data concentrator 50 via a data link 52. The ticket voucher data noted above may be transferred from the CVTs 44 to the data concentrator 50 in any manner, such as being automatically transferred by the CVTs 44 upon receipt or by being transferred only in response to being polled by the data concentrator 50. The ticket voucher data may be transferred from the data concentrator 50 to a front-end controller 56 in any manner, and the ticket voucher data may be transferred from the front-end controller 56 to a server computer 58 in any manner.

The server computer 58 may be connected to a plurality of cashier computers 60 and to an audit computer 62 via a data link 64, which could be a data bus or networked data link. The server computer 58 may also be connected to an administration computer 66 via a data link 68 and to an accounting computer 70 via a data link 72. The server computer 58 may function to allow the ticket voucher data noted above to be accessible by, or may cause the data to be stored in, the cashier computers 60, the audit computer 62, the administration computer 66, and/or the accounting computer 70. The server computer 58 could also allow other data to be made accessible to or stored in those computers, and the server computer 58 could perform other functions.

Many modifications of the system 40 described above could be made. For example, the front-end controller 56 and the data concentrator 50 could be eliminated, and the CVTs 44 could be operatively coupled directly to the server computer 58. The CVTs 44 could be operatively coupled to the server computer 58 via the Internet or via a wireless connection instead of a physical, direct-wire connection. The gambling units 42 could be coupled to the CVTs 44 via a wireless connection. Alternatively, the CVTs 44, the data concentrator 50, and the front-end controller 56 could be omitted, and the gambling units 42 could be coupled directly to the server computer 58 or via a wireless connection.

Clerk Validation Terminals

Figure 3:
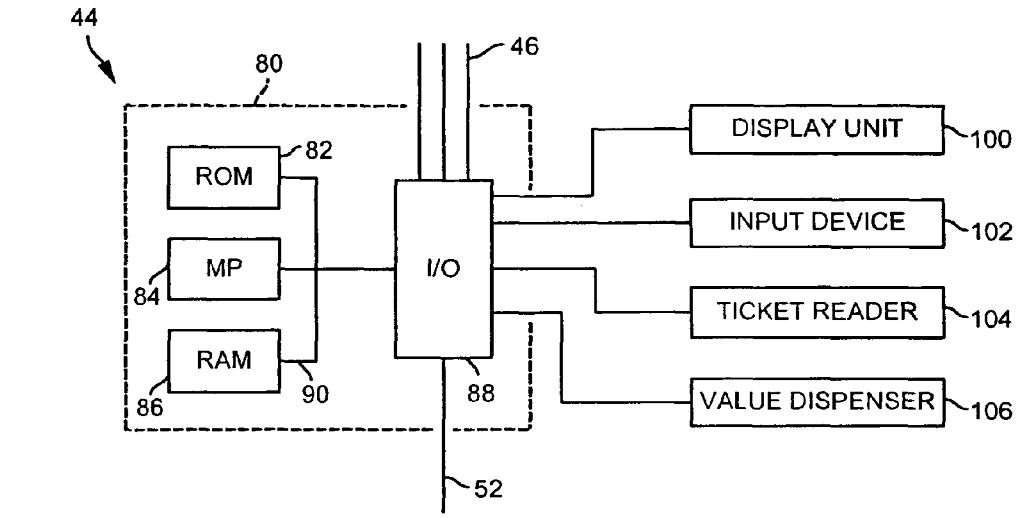
FIG. 3 is a block diagram of an embodiment of one of the clerk validation terminals schematically shown in FIG. 2.

A block diagram of one possible embodiment of one of the CVTs 44 is shown in FIG. 3. Referring to FIG. 3, the CVT 44 may be provided with a controller 80 that may comprise a read-only memory (ROM) 82, a microprocessor (MP) 84, a random-access memory (RAM) 86 and an input/output (I/O) circuit 88, all of which may be interconnected via an address/data bus 90. The ROM 82 may be a programmable ROM, and the RAM 86 or a portion of the RAM 86 may be non-volatile (such as by being provided with battery backup) so that ticket voucher data stored in the RAM 86 or RAM 86 portion is not lost upon power down. A computer program may be stored in the ROM 82 to control the operation of the CVT 44.

The CVT 44 may include a display unit 100, which may be any type of display unit such as a cathode-ray tube (CRT), a flat panel display, etc., and an input device 102 such as a keyboard, a mouse or a touch-sensitive device associated with the display unit 100. The CVT 44 may also include a credit-input device, such as a ticket reader 104 that is capable of reading data disposed on a ticket voucher. The credit input device 104 may be any type of device, such as one that optically detects data printed on an item of value such as a ticket voucher or one that detects data encoded magnetically on an item of value such as a ticket voucher, for example. The CVT 44 may also include a value dispenser 106, which may be any type of device for dispensing value to a customer, such as a cash dispenser, a casino chip dispenser, etc.

Ticket Voucher

Figure 4:
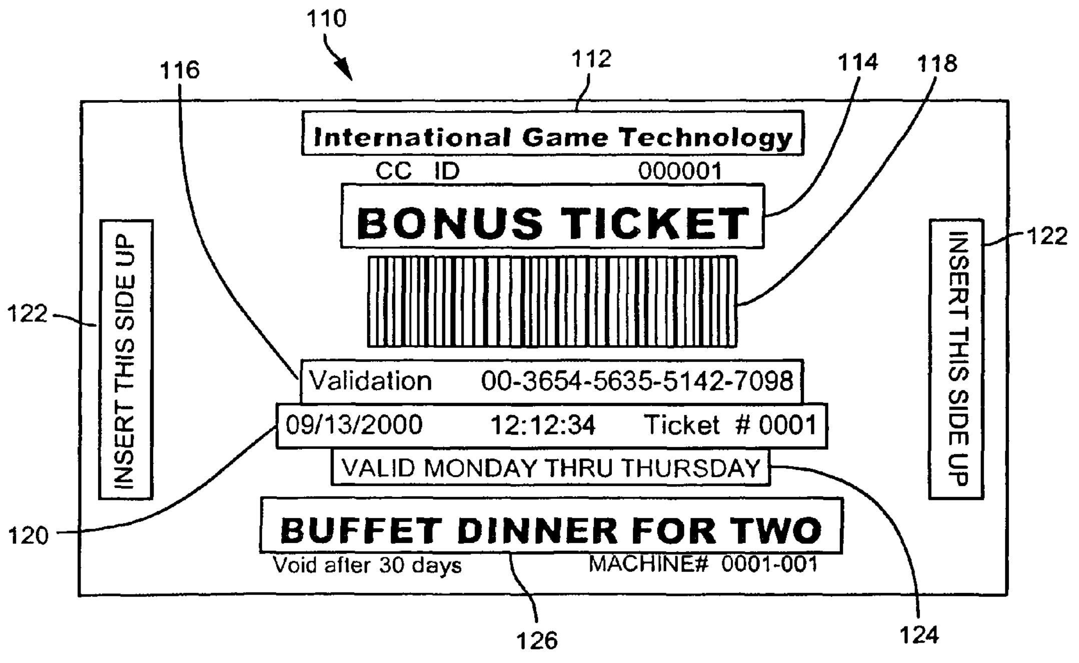
FIG. 4 is an illustration of one embodiment of a ticket voucher.

An illustration of one possible example of a ticket voucher 110 that may be printed by the gambling units 42 and read by the CVTs 44 is illustrated in FIG. 4. Referring to FIG. 4, the ticket voucher 110 may be composed of paper or another printable material and may have printed information including the casino name 112, the type of ticket voucher 114, a validation number 116, a bar code 118 with control and/or security data, the date and time of issuance 120, redemption instructions 122 and restrictions 124, a description of an award 126, and any other information that may be necessary or desirable. Different types of ticket vouchers could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers could be printed with an optically readable material such as ink, or data on the ticket vouchers could be magnetically encoded.

Overall Operation of Gambling System

During operation of the casino gambling system 40, a casino customer may play various casino games, such as video poker, video blackjack, video slots, etc., utilizing one or more of the gambling units 42. After the completion of play, the customer may be provided with a ticket voucher 110, which may be printed or magnetically encoded by one of the gambling units 42 and presented to the customer. The customer may present the ticket voucher 110 for redemption at one of the CVTs 44 operatively coupled to the gambling unit 42 that issued the ticket voucher 110, or alternatively, the customer may present the ticket voucher 110 to a cashier operating one of the cashier computers 60.

Referring to FIG. 3, when a ticket voucher 110 is redeemed using one of the CVTs 44, the ticket voucher 110 may be inserted into the ticket reader 104 incorporated in the CVT 44. The CVT 44 may then optically or magnetically read the data on the ticket voucher 110 and perform a ticket validation process to make sure the ticket voucher 110 is valid and has not already been redeemed. For example, the CVT 44 could check to make sure that the validation number on the ticket voucher 110 corresponds to a validation number that was issued by one of the gambling units 42; the CVT 44 could check to determine whether the redemption restrictions are satisfied; the CVT 44 could check to determine whether the ticket voucher 110 has already been redeemed (by checking a list of redeemed ticket voucher numbers stored in the memory of the CVT 44); etc. If the CVT 44 determines that the ticket voucher 110 is valid, the CVT could dispense cash or other value items via the value dispenser 106.

If the customer prefers to present the ticket voucher 110 to a cashier for redemption, the cashier could insert the ticket voucher 110 into a cashier computer 60, and the cashier computer 60 could perform the same validation and redemption process described above in connection with the CVTs 44.

Cashier Computers

Figure 5A:
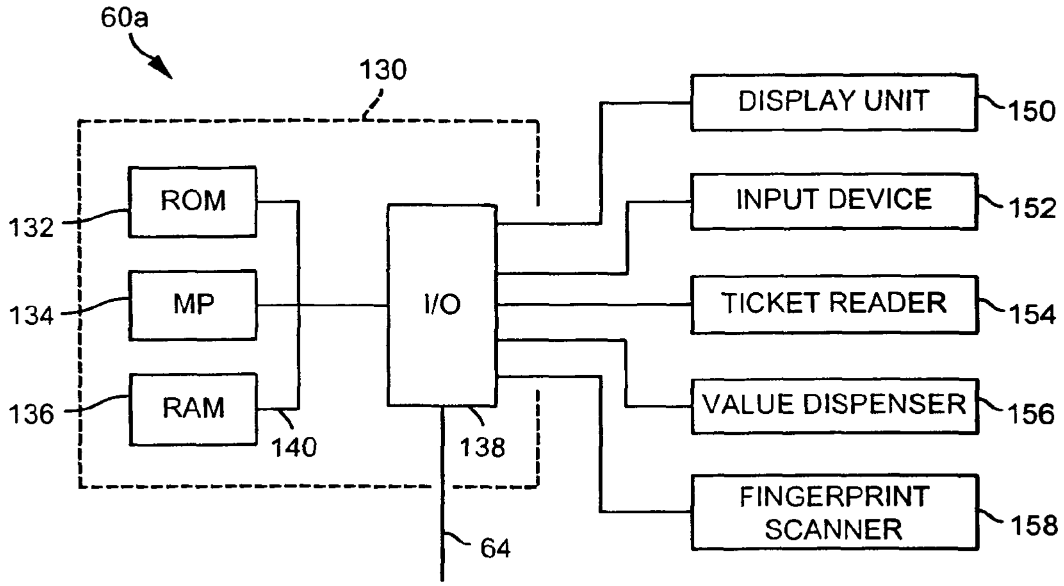
FIGS. 5A-5D are block diagrams of various embodiments of cashier computers schematically shown in FIG. 2.

FIG. 5A is a block diagram of a first possible embodiment 60*a* of one of the cashier computers 60 shown schematically in FIG. 2. Referring to FIG. 5A, the cashier computer 60*a* may be provided with a controller 130 that may comprise a read-only memory (ROM) 132, a microprocessor (MP) 134, a random-access memory (RAM) 136 and an input/output (I/O) circuit 138, all of which may be interconnected via an address/data bus 140. The ROM 132 may be a programmable ROM, and the RAM 136 or a portion of the RAM 136 may be non-volatile (such as by being provided with battery backup) so that any ticket voucher data stored in the RAM 136 or RAM 136 portion is not lost upon power down. A computer program may be stored in the ROM 132 to control the operation of the cashier computer 60*a*.

The cashier computer 60*a* may include a display unit 150, which may be any type of display unit such as a cathode-ray tube (CRT), a flat panel display, etc., and an input device 152 such as a keyboard, a mouse or a touch-sensitive device associated with the display unit 150. The cashier computer 60*a* may also include a credit-input device, such as a ticket reader 154 that is capable of reading data disposed on a ticket voucher 110. The ticket reader 154 may be any type of reading device, such as one that optically detects data printed on a ticket voucher 110 or one that detects data encoded magnetically on a ticket voucher 110, for example. The cashier computer 60*a* may also include a value dispenser 156, which may be any type of device for dispensing value to a customer, such as a cash dispenser, a casino chip dispenser, etc. The cashier computer 60*a* may also include a fingerprint scanner 158, which may be any device that is capable of detecting the fingerprint of a person and generating digital data representing the fingerprint.

Figure 5B:
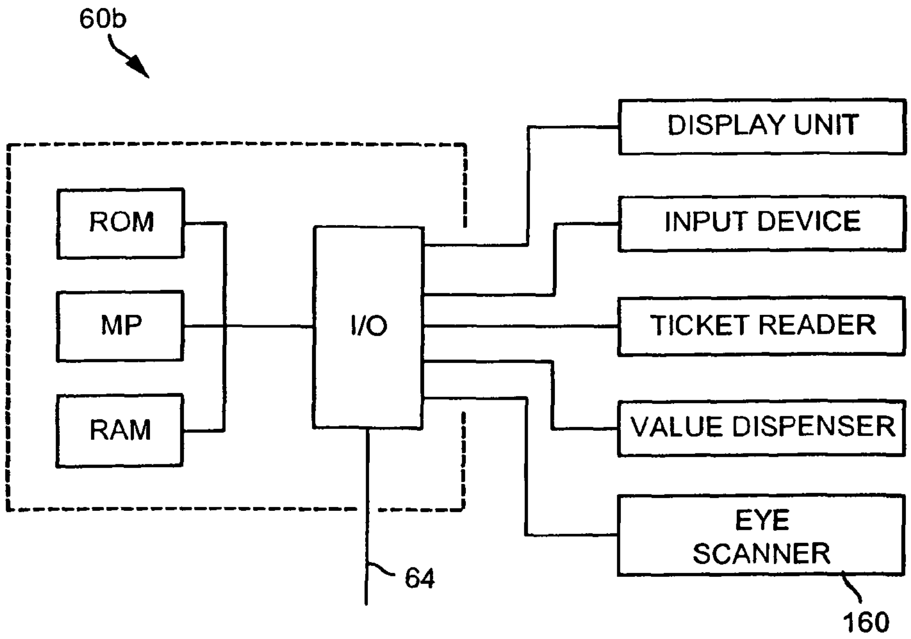

FIG. 5B is a block diagram of a second possible embodiment 60*b* of one of the cashier computers 60 shown schematically in FIG. 2. Referring to FIG. 5B, the cashier computer 60*b* may be identical to the cashier computer 60*a* described above in connection with FIG. 5A, except that an eye scanner 160 may be utilized instead of the fingerprint scanner 158. The eye scanner 160 may be any type of device that is capable of detecting a portion of the eye of a person, such as the iris of a person's eye, and generating digital data representing an image of the eye or digital data representing physical characteristics of the eye, such as color.

Figure 5C:
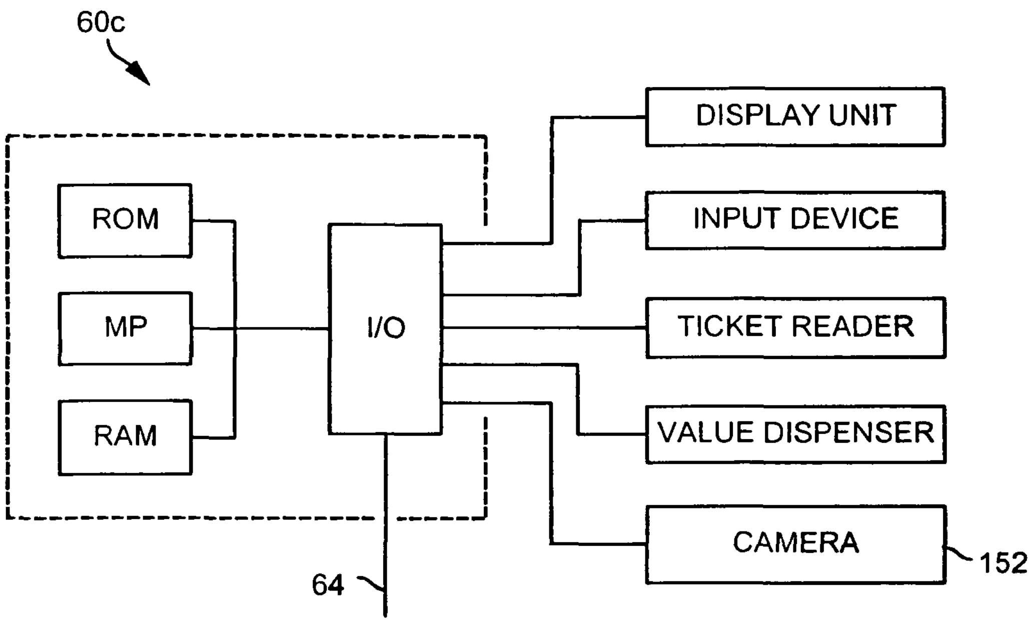

FIG. 5C is a block diagram of a third possible embodiment 60*c* of one of the cashier computers 60 shown schematically in FIG. 2. Referring to FIG. 5C, the cashier computer 60*c* may be identical to the cashier computer 60*a* described above in connection with FIG. 5A, except that a camera 162 may be utilized instead of the fingerprint scanner 158. The camera 162, which may be any type of camera or a combination of a camera and data-processing circuitry, may be used to generate a digital image of a portion of a person, such as a person's face.

Figure 5D:
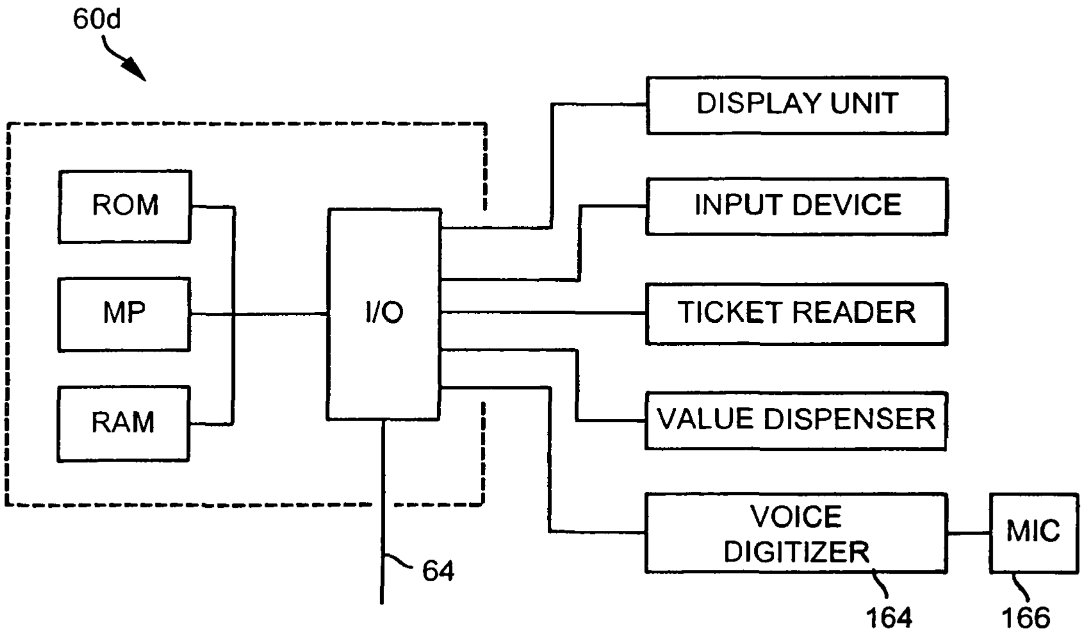

FIG. 5D is a block diagram of a fourth possible embodiment 60*d* of one of the cashier computers 60 shown schematically in FIG. 2. Referring to FIG. 5D, the cashier computer 60*d* may be identical to the cashier computer 60*a* described above in connection with FIG. 5A, except that a voice digitizer 164 and a microphone 166 may be utilized instead of the fingerprint scanner 158. The microphone 166 may be used to generate a voice signal in response to detecting sound corresponding to one or more words spoken by a person, such as a casino employee. The voice signal could be provided to the voice analyzer 164, which could be any type of device or circuit, such as the combination of a sampling and analog-to-digital converter circuit or a portion of a voice-recognition circuit, which may generate a digital voice signature or digital data representing the unique frequency characteristics of a person's voice.

Employee Enrollment Routine

Figure 6:
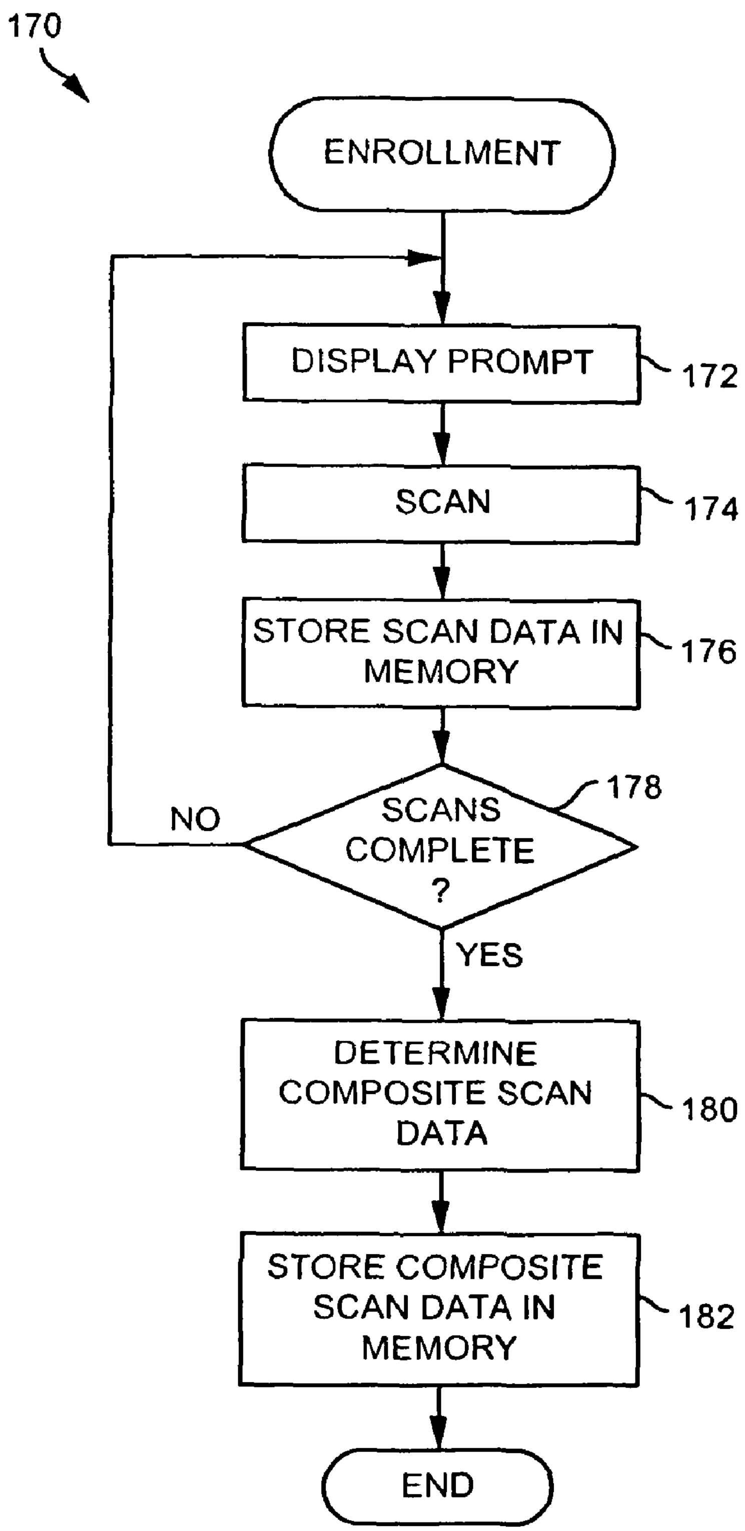
FIG. 6 is a flowchart of an enrollment routine that may be performed by the cashier computers schematically shown in FIG. 2.

FIG. 6 is a flowchart of a casino employee enrollment routine 170 that may be used in connection with controlling access to the operation of the cashier computers 60. The enrollment routine 170 may be part of a computer program, which may be stored in the ROM 132 (FIG. 5A) of any of the cashier computers 60, that controls the operation of the cashier computers 60 to limit the access or use of those computers 60 to authorized personnel only. The enrollment routine 170 may be used by the cashier computers 60*a*, 60*b* having the fingerprint and eye scanners 158, 160 described above in connection with FIGS. 5A and 5B, and it may be used by the cashier computers 60*c*, 60*d* having the camera 162 and microphone 166 described above in connection with FIGS. 5C and 5D. The basic purpose of the enrollment routine 170 is to store digital data that uniquely represents the physical characteristics of a person, such as a person's fingerprint, and thus uniquely identifies the person.

The operation of the enrollment routine 170 is described below in connection with the cashier computer 60*a* shown in FIG. 5A. Referring to FIG. 6, the enrollment routine 170 may begin operation at block 172, at which point the controller 130 of the cashier computer 60*a* may cause the display unit 150 to display a visual message that prompts the user, who may be a cashier or another casino employee, to place his or her finger on the scanner 158, for example. At block 174, the fingerprint scanner 158 may scan the person's fingerprint and generate digital data representing the person's fingerprint, as described above. At block 176, the digital data representing the person's fingerprint may be stored in the memory of the cashier computer 60*a*.

Blocks 172-176 may be repeated a number of times, if desired, to generate digital data representing a composite fingerprint scan, which may be generated by averaging each set of digital fingerprint data, for example. Performing multiple scans may increase the reliability and/or accuracy of the scan data. If multiple scans are not used, the operation represented by blocks 178 and 180 may be omitted.

If multiple scans are used to generate data representing a composite scan, at block 178 the controller 130 determines whether all of the scans have been made. That determination may be made, for example, simply by determining whether a predetermined number of scans has been made, such as five scans. If a predetermined number of scans have not been made, the program may branch back to block 172 so that another scan is performed. If all the scans have been made, the controller 130 may determine a composite scan based on all the scans made, such as by averaging the digital data for each scan. Such an average could be made, for example, by averaging the pixel intensity of each set of scan data on a pixel-by-pixel basis. After the composite scan is determined, at block 182 the digital data representing the composite scan may be stored in the memory of the controller 130 so that it can later be used to identify the person who just "enrolled" when that person later logs on or otherwise tries to gain access or use particular functions of the cashier computers 60. Alternatively, the digital data representing a composite scan (or a single scan if blocks 178, 180 are omitted) could be stored in the memory of the server computer 58 so that it could be accessed by any of the cashier computers 60.

Although the enrollment routine 170 has been described above in connection with the fingerprint scanner 158 of FIG. 5A, it should be understood that the same or a similar routine could be used to "train" the system to recognize other unique physical characteristics of a person, such as a person's eye, face or voice as described above.

For example, if the routine 170 is used in connection with the cashier computer 60 having the voice digitizer 164 and the microphone 166, at block 174, instead of performing a scan of a person's fingerprint, the person may speak into the microphone 166, and the voice digitizer 164 may generate a set of digital data represented the spoken word or words. That digital voice data may be treated and processed by the enrollment routine 170 in the same manner as the digital fingerprint data, as described above.

Access-Control Routine

Figure 7:
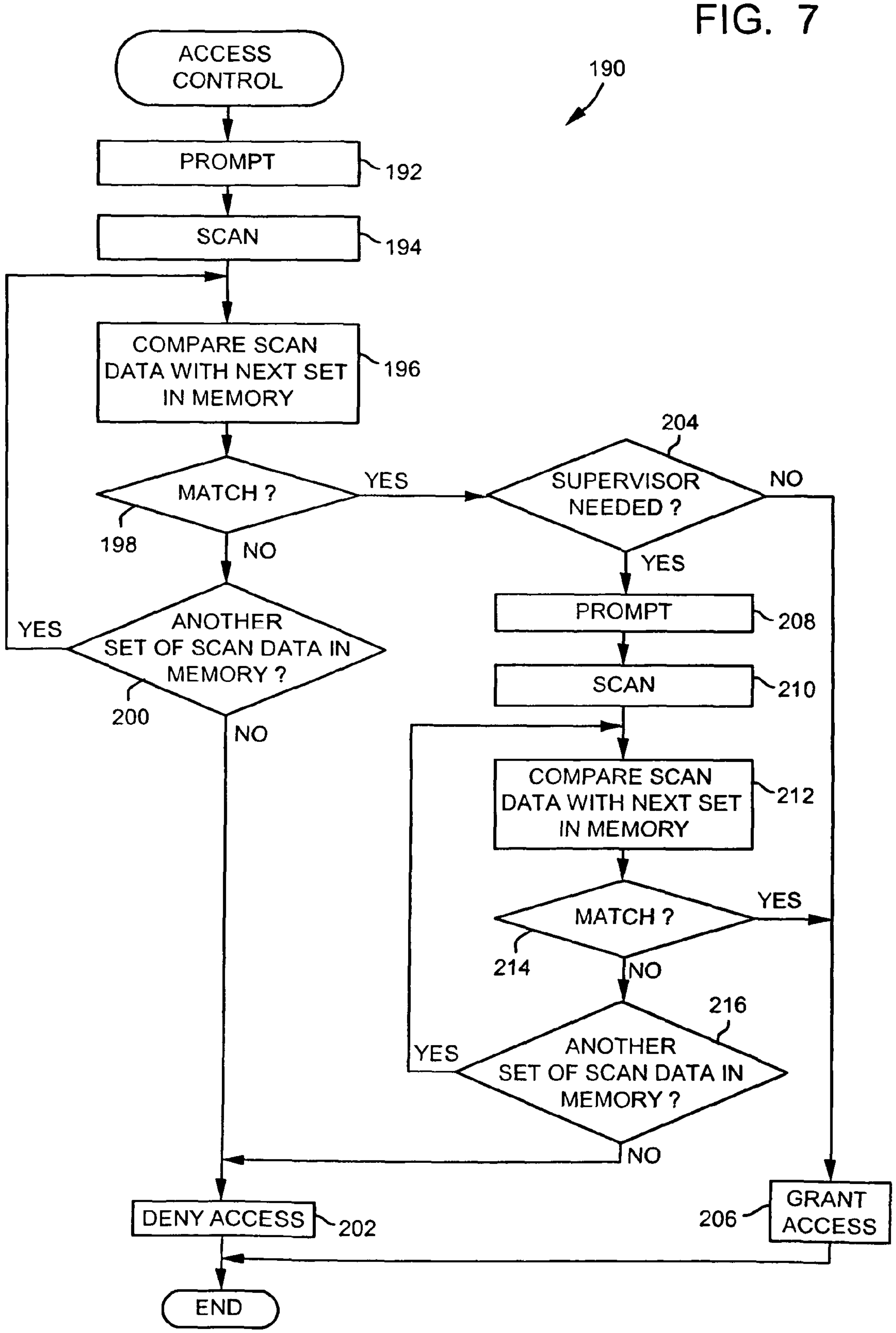
FIG. 7 is a flowchart of an access-control routine that may be performed by the cashier computers schematically shown in FIG. 2.

FIG. 7 is a flowchart of an access-control routine 190 that may be used to control access to the operation of the cashier computers 60 to persons who have previously been authorized access to those computers by prior enrollment through the enrollment routine 170 described above. The access-control routine 190 may form part of a computer program, which may be stored in the ROM 132 (FIG. 5A) of any of the cashier computers 60, that controls the operation of the cashier computers 60 to limit the access or use of those computers 60 to authorized personnel only. The access-control routine 190 may be used by the cashier computers 60*a*, 60*b* having the fingerprint and eye scanners 158, 160 described above in connection with FIGS. 5A and 5B, and it may be used by the cashier computers 60*c*, 60*d* having the camera 162 and microphone 166 described above in connection with FIGS. 5C and 5D.

Referring to FIG. 7, the access-control routine 190 may begin operation at block 192, at which point the controller 130 may cause a visual message to be displayed on the display unit 150 to prompt the cashier to place his or her finger on the fingerprint scanner 158, for example. At block 194, the fingerprint scanner 158 may scan the person's fingerprint and generate digital data representing the person's fingerprint, as described above. At block 196, the digital data representing the person's fingerprint as just scanned may be compared with digital fingerprint data corresponding to a fingerprint stored in memory.

For example, the memory of the cashier computer 60 may store 100 sets of fingerprint data, each set corresponding to a fingerprint of a different casino employee. The access-control routine 190 may determine whether access is authorized by comparing the fingerprint data generated at block 194 with each stored set of fingerprint data, and the routine 190 may assume that access is authorized if the fingerprint data generated at block 194 matches any one of the stored sets of fingerprint data.

Thus, at block 198, if the fingerprint data from the scan performed at block 198 does not match the next (or first) set of fingerprint data, then the program returns to block 196 where the fingerprint data generated at block 194 is compared with the next set of fingerprint data stored in memory. At block 200, if there is not another set of fingerprint data stored in memory (and no match has been made at block 198), the controller 130 causes access to the cashier computer 30 to be denied at block 202, at which point a corresponding access-denied message may be displayed on the display unit 150.

If there was a match as determined at block 198, the program may branch to block 204, where the controller 130 may determine whether a supervisor's approval is needed to access the cashier computer 60. For example, a supervisor's approval may be needed at certain of the cashier computers 60. Alternatively, a supervisor's approval may be needed for certain functions or operations that may be performed on each of the cashier computers 60. As a further alternative, a supervisor's approval may be needed for all functions or operations that exceed a certain monetary limit, such as $1,000. In any case, if a supervisor's approval is not required as determined at block 204, the program may branch to block 206, where the controller 130 may cause access to be granted to the cashier, and may cause a corresponding access-granted message to be displayed on the display unit 150.

If a supervisor's approval is needed as determined at block 204, the acts described in blocks 208-216 may be performed to verify the identity of a supervisor. In particular, at block 208, the controller 130 may cause a visual message to be displayed on the display unit 150 to prompt the supervisor to place his or her finger on the fingerprint scanner 158, for example. At block 210, the fingerprint scanner 158 may scan the supervisor's fingerprint and generate digital data representing the supervisor's fingerprint. At block 212, the digital data representing the supervisor's fingerprint just scanned may be compared with digital fingerprint data corresponding to a fingerprint stored in memory, which fingerprint data may be limited to fingerprint data for a number of supervisors that are authorized to act in a supervisory capacity. At block 214, if the fingerprint data from the scan performed at block 210 does not match the next (or first) set of fingerprint data stored in memory, the program returns to block 212 where the fingerprint data generated at block 210 is compared with the next set of fingerprint data stored in memory. At block 214, if there is not another set of fingerprint data stored in memory (and no match has been made at block 214), the controller 130 causes access to the cashier computer 30 to be denied at block 202. If there was a match as determined at block 214, the program may branch to block 206, where access is granted.

Although the access-control routine 190 is described above in connection with the fingerprint scanner 158 of FIG. 5A, it should be understood that the same or a similar routine could be used to recognize and grant access to authorized casino employees based on other unique physical characteristics of a person, such as a person's eye, face or voice as described above.

For example, if the routine 190 is used in connection with the cashier computer 60 having the voice analyzer 164 and the microphone 166, at block 194, instead of performing a scan of a person's fingerprint, the person speaks into the microphone 166 and the voice analyzer 164 generates a set of digital data represented the spoken word or words. That digital voice data may be treated and processed by the enrollment routine 190 in the same manner as the digital fingerprint data, as described above.

Access to Audit, Administrative and Accounting Computers

The audit computer 62, the administration computer 66, and the accounting computer 70 shown schematically in FIG. 2 could have the same or a similar structure as the cashier computers 60*a*-60*d* shown in FIGS. 5A-5D, and access to those computers 62, 66, 70 could be controlled by using the same or a similar employee enrollment routine as described above in connection with FIG. 6 and the same or a similar access-control routine as described above in connection with FIG. 7. As one example, the computers 62, 66, 70 need not incorporate the ticket readers 154 (FIG. 5A) and the value dispensers 156 of the cashier computers 60.

Gambling Units

The gambling units 42 schematically shown in FIG. 2 may be any type of casino gambling unit and may have various different structures and methods of operation. For exemplary purposes, a particular type of gambling unit 42 is described below, but it should be understood that numerous other types may be utilized in the casino gambling system 40.

Figure 8:
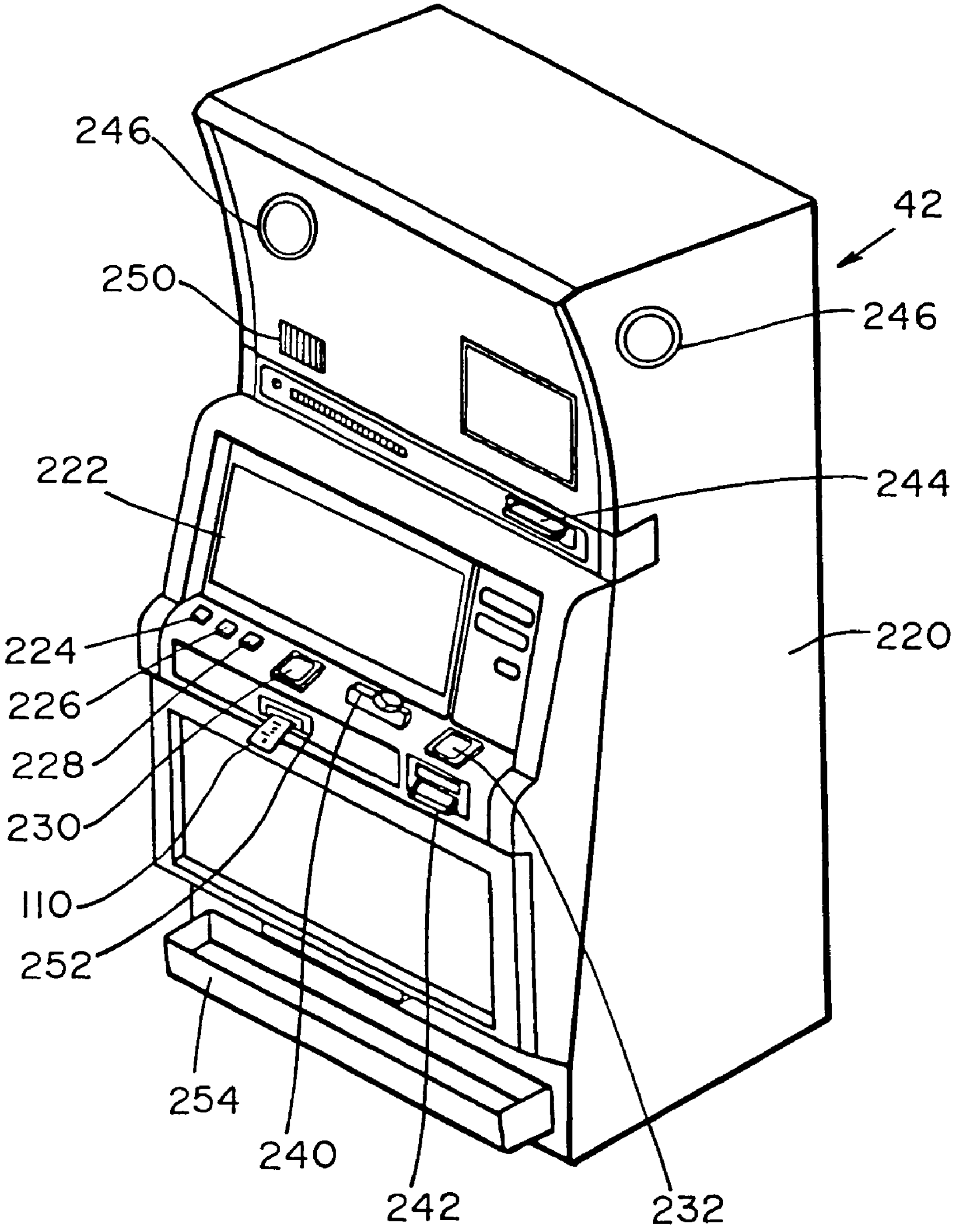
FIG. 8 is a perspective view of an embodiment of a gambling unit schematically shown in FIG. 2.

Referring to FIG. 8, a casino gambling unit 42 may include a cabinet 220, a color display unit 222 disposed on the front of the cabinet 220 for displaying graphics and information associated with one or more video gambling games that a casino customer may play. The gambling unit 42 may also include a variety of input devices, such as a plurality of buttons 224, 226, 228, 230 that a customer may actuate to make wagers and game-specific selections such as hold or discard decisions, a video slots spin button 232, and/or any other type of input device.

The casino gambling unit 42 may include a variety of currency- or value-accepting mechanisms that may be disposed on the front of the gambling unit 42 or in any other suitable location. The value-accepting mechanisms may include any device that can accept value from a customer. As used herein, the term "value" may encompass gambling tokens, coins, paper currency, ticket vouchers, and any other suitable object representative of value. For example, the value-accepting mechanisms may include a coin acceptor 240 that accepts coins or tokens; a bill acceptor 242 that accepts and validates paper currency; a card or ticket reader 244 that accepts coupons, credit cards, printed cards, smart cards, ticket vouchers, etc.; and any other device that may accept a medium of value.

The gambling unit 42 may include additional features to enhance a player's game-playing experience, such as one or more audio speakers 246, a sound-generating circuit 248 (FIG. 9), and an aroma dispenser 250. The audio speakers 246 may provide various forms of sound relevant to the video gambling game that the player is playing. For example, the speakers 246 may generate audio representing sounds such as the noise of spinning slot machine reels, a dealer's voice, music, announcements or any other suitable audio related to a video gambling game. The aroma dispenser 250, which may be mounted above the display unit 222 or in any other suitable location on the gambling unit 42, may be manufactured by MicroScent or DigiScents.

The gambling unit 42 may also include a printer 252 disposed on the front of the gambling unit 42 or in any other suitable location. The printer 252 may be used, for example, to print the ticket vouchers 110 described above. The gambling unit 42 may also include a payout tray 254 of the type provided on slot machines, for example. Further details regarding the gambling unit 42 are described in a patent application entitled "Electronic Gambling Unit With Enclosed Seating Unit," U.S. Ser. No. 09/690,412 filed in the U.S. Patent Office on Oct. 17, 2000, which is incorporated herein by reference in its entirety.

Gambling Unit Electronics

Figure 9:
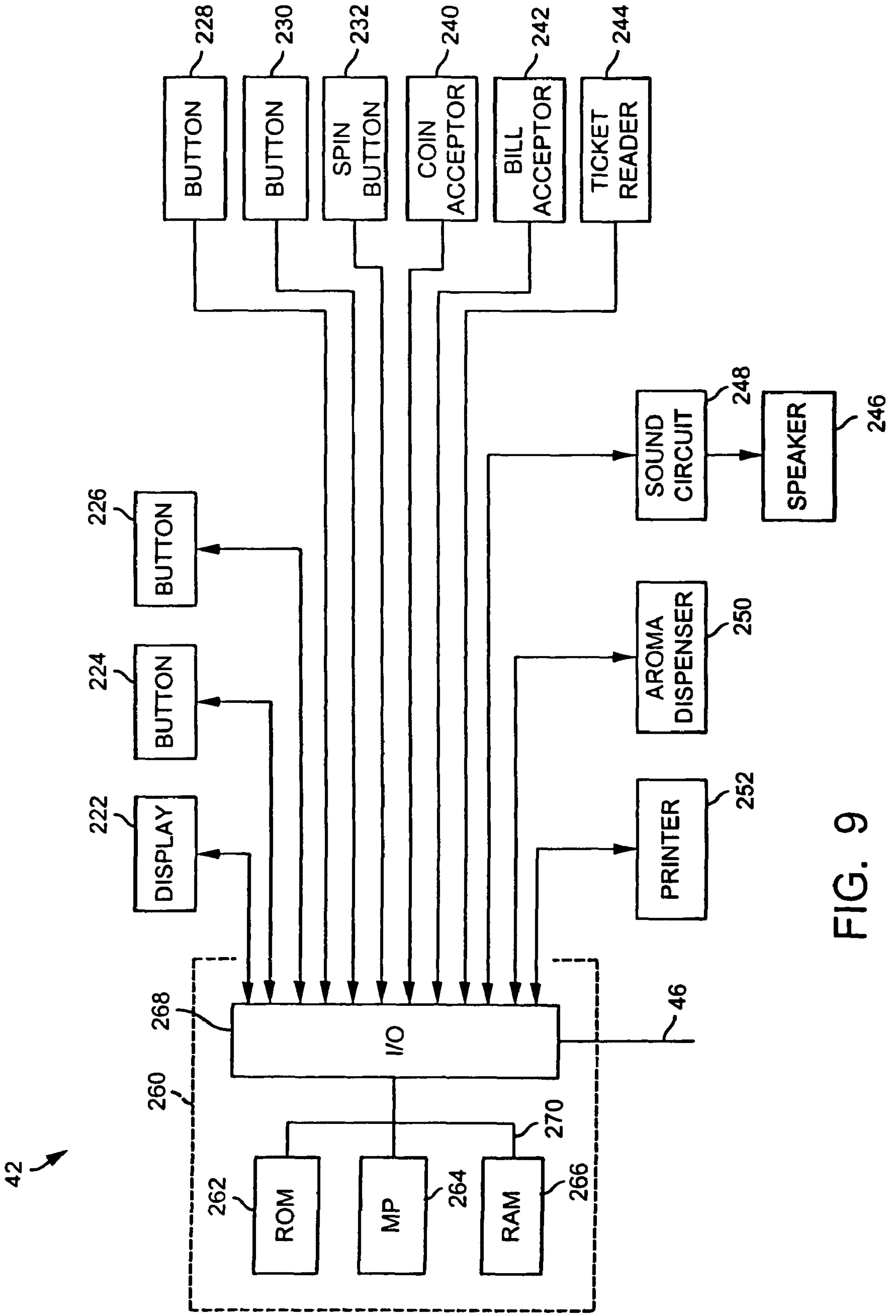
FIG. 9 is a block diagram of the electronic components of the gambling unit of FIG. 8.

FIG. 9 is a block diagram of a number of components that may be incorporated into the gambling unit 42. Referring to FIG. 9, the gambling unit 42 may include a controller 260 that may comprise a read-only memory (ROM) 262, a microcontroller or microprocessor (MP) 264, a random-access memory (RAM) 266 and an input/output (I/O) circuit 268, all of which may be interconnected via an address/data bus 270. It should be appreciated that although only one microprocessor 264 is shown, the controller 260 could include multiple microprocessors 264. Similarly, the memory of the controller 260 could include multiple RAMs 266 and multiple ROMs 262. Although the I/O circuit 268 is shown as a single block, it should be appreciated that the I/O circuit 268 could include a number of different types of I/O circuits. The RAM(s) 264 and ROM(s) 262 could be implemented as semiconductor memories, magnetically readable memories, and/or optically readable memories, for example.

FIG. 9 also illustrates that the components shown in FIG. 8 could be connected to the I/O circuit 268 via a respective direct line or conductor. Different connection schemes could be used. For example, one or more of the components shown in FIG. 9 could be connected to the I/O circuit 268 via a common bus or other data link that is shared by a number of components. Furthermore, some of the components could be directly connected to the microprocessor 264 without passing through the I/O circuit 268.

Overall Operation of Gambling Unit

One manner in which the gambling unit 42 may operate is described below in connection with a number of flowcharts which represent a number of portions or routines of one or more computer programs, which may be stored in one or more of the memories of the controller 260. The computer program(s) or portions thereof may be stored remotely, outside of the gambling unit 42, and may control the operation of the gambling unit 42 from a remote location. Such remote control may be facilitated with the use of a wireless connection, or by an Internet interface (not shown) that connects the gambling unit 42 with a remote computer (not shown) having a memory in which the computer program portions are stored via the Internet. The computer program portions may be written in any high level language such as C, C+, C++ or the like or any low-level, assembly or machine language. By storing the computer program portions therein, various portions of the memories 262, 266 are physically configured, either magnetically (e.g. in the case of a magnetic memory), electrically (e.g. in the case of a semiconductor memory) or structurally (e.g. in the case of an optical memory), in accordance with computer program instructions.

Figure 10:
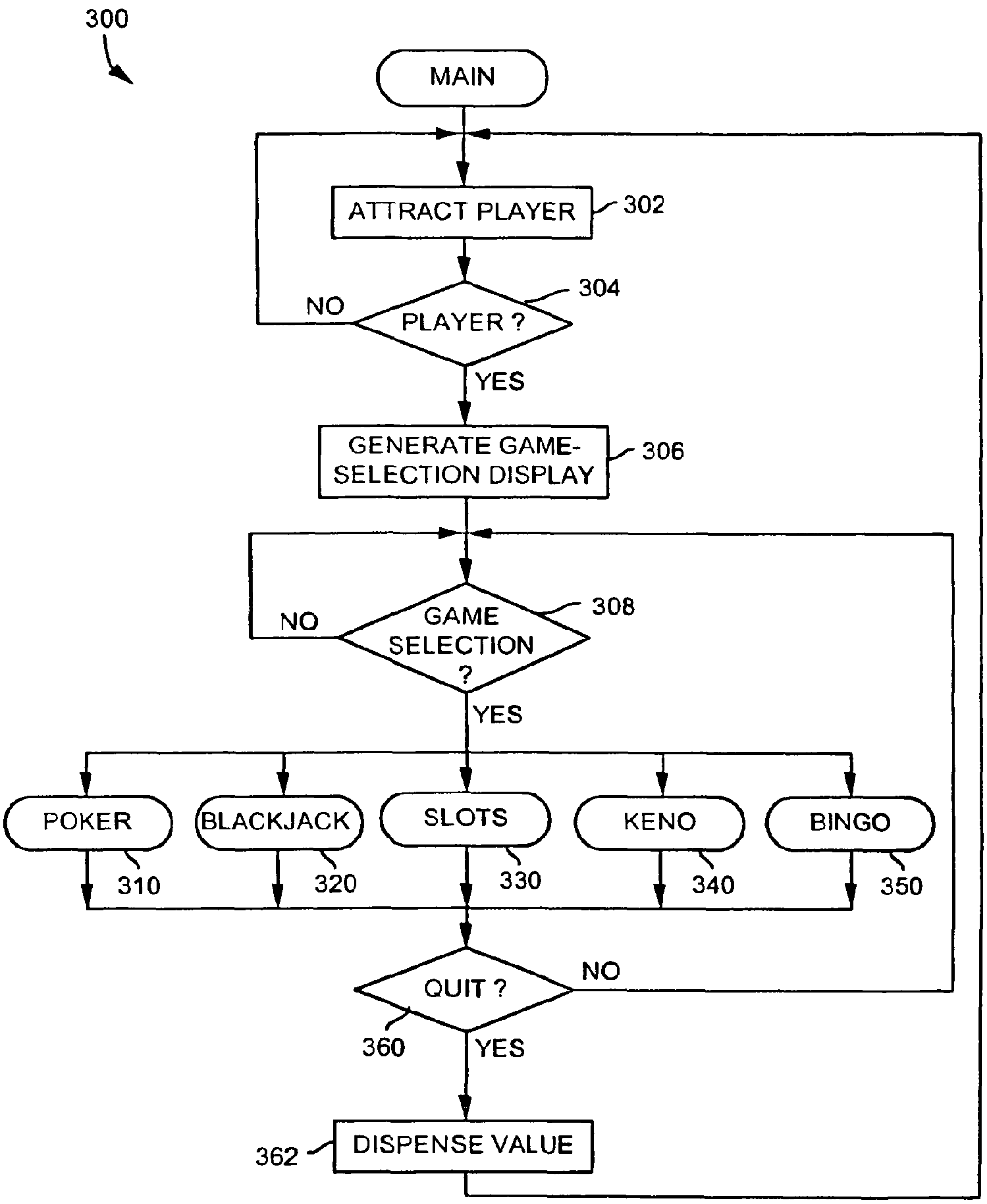
FIG. 10 is a flowchart of a main routine that may be performed by the controller shown in FIG. 9.

FIG. 10 is a flowchart of a main operating routine 300 that may be stored in the memory of the controller 260. Referring to FIG. 10, the main routine 300 may begin execution at block 302 at which player attraction graphics may be displayed on the display unit 222 (FIG. 9) of the gambling unit 42. Player attraction graphics may include a scrolling list of games that may be played on the electronic gambling unit 42, cartoons, videos, etc. While graphics are being displayed, the controller 260 may intermittently check to see if a player is detected at block 304. Such an act may be carried out, for example, by polling the value-accepting devices 240, 242, 244 or one of the input devices 224, 226, 228, 230. Alternatively, the value-accepting devices 240, 242, 244 and touch-sensitive devices 224, 226, 228, 230 may be programmed to notify the controller 260 when valid currency is inserted or player contact is detected, respectively. As long as no player is detected, the attraction graphics may be displayed at block 302.

At block 306, a game-selection graphic may be displayed on the display unit 222 to the player. The game-selection graphic may include a list of video gambling games that may be played on the electronic gambling unit 42. Additionally, the player may be prompted to deposit value into the electronic gambling unit 42, via one of the value-accepting devices 240, 242, 244. The routine 300 may not proceed past the block 306 until the player deposits at least the minimum value required for the gambling unit 42. Any value that the player deposits may be stored as credit.

In response to the detection of a deposit of currency or other value by the player, the controller 260 may cause a message to be displayed on the display unit 222 prompting the player to select one of a number of video gambling games. Upon detection of a player selection at block 308, the controller 260 may cause one of a number of gambling game routines to be performed to allow the player to play a selected gambling game. For example, the gambling game routines could include a video poker routine 310, a video blackjack routine 320, a video slots routine 330, a video keno routine 340, and a video bingo routine 350.

It should be noted that although five video gambling routines are shown in FIG. 10, a different number of routines could be included to allow play of a different number of gambling games. Alternatively, the gambling unit 42 may be programmed to allow play of only one type of gambling game. The gambling unit 42 may also be programmed to allow play of different games, such as a slot machine with mechanical wheels.

After one of the routines 310, 320, 330, 340, 350 has been performed to allow the player to play one of the games, block 360 may be utilized to determine whether the player wishes to terminate play on the gambling unit 42 or to select another game. If the player wishes to stop playing the electronic gambling unit 42, which wish may be expressed, for example, by selecting a quit graphic displayed on the display unit 222 or through another input device, the controller 260 may dispense value to the player at block 362, based on the outcome of the games played by the player. The controller 260 may then cause the display unit 222 to display attraction graphics to attract another player. If the player did not wish to quit as determined at block 360, the program may branch back to block 308 where another game selection may be made by the player.

Video Poker

Figure 11:
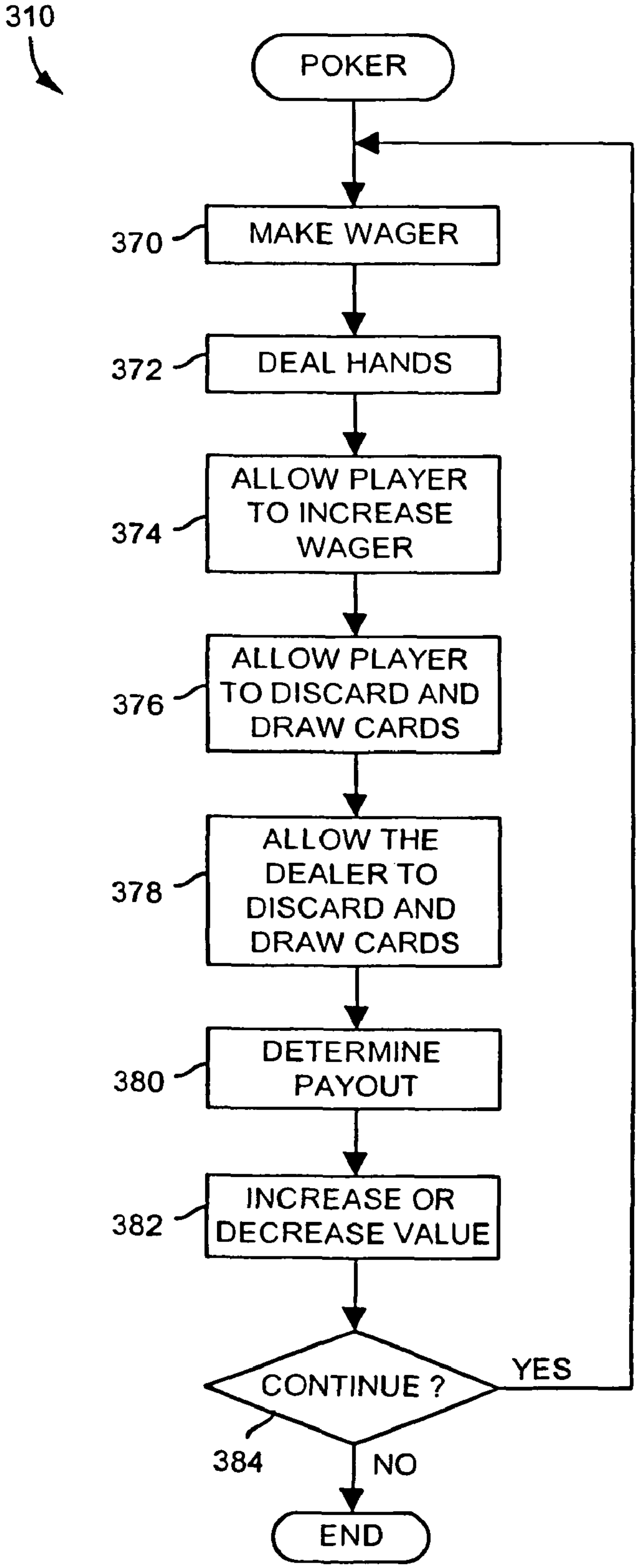
FIG. 11 is a flowchart of video poker routine that may be performed by the controller of FIG. 9.

FIG. 11 is a flowchart of the video poker routine 310 shown schematically in FIG. 10. Referring to FIG. 11, at block 370 the controller 260 may cause a display to be generated on the display unit 222 to prompt the player to make a wager. After a wager is entered, the controller 260 may cause a pair of virtual poker hands of cards to be "dealt" to the player and to the dealer at block 372 by causing the display unit 222 to display the virtual hands. After the virtual hands have been "dealt," the player may have an opportunity at block 374 to increase the initial wager made at the block 370. At block 376, the player may be allowed to discard and draw new cards in an attempt to improve the player's poker hand, and at block 378 the dealer (which may be, for example, the electronic gambling unit 42) may be allowed to discard and draw new cards in an attempt to improve the dealer's poker hand.

At block 380, the controller 260 may determine the outcome of the poker game and a corresponding payout. If the player has won the game (i.e. the player's hand is better than the dealer's hand), the payout will be positive. If the player has not won the game, the player may forfeit the wager(s) made at the blocks 370 and/or 374. At block 382, the controller 260 may increase or decrease the player's value based on the results of the poker game as determined at the block 380. At block 384, the controller 260 may cause a message to be displayed on the display unit 222 asking whether the player desires to continue playing the video poker game. If so, the routine may branch back to block 370. If not, the poker routine 310 may end and the controller 260 may cause block 360 of FIG. 10 to be performed.

Figure 12:
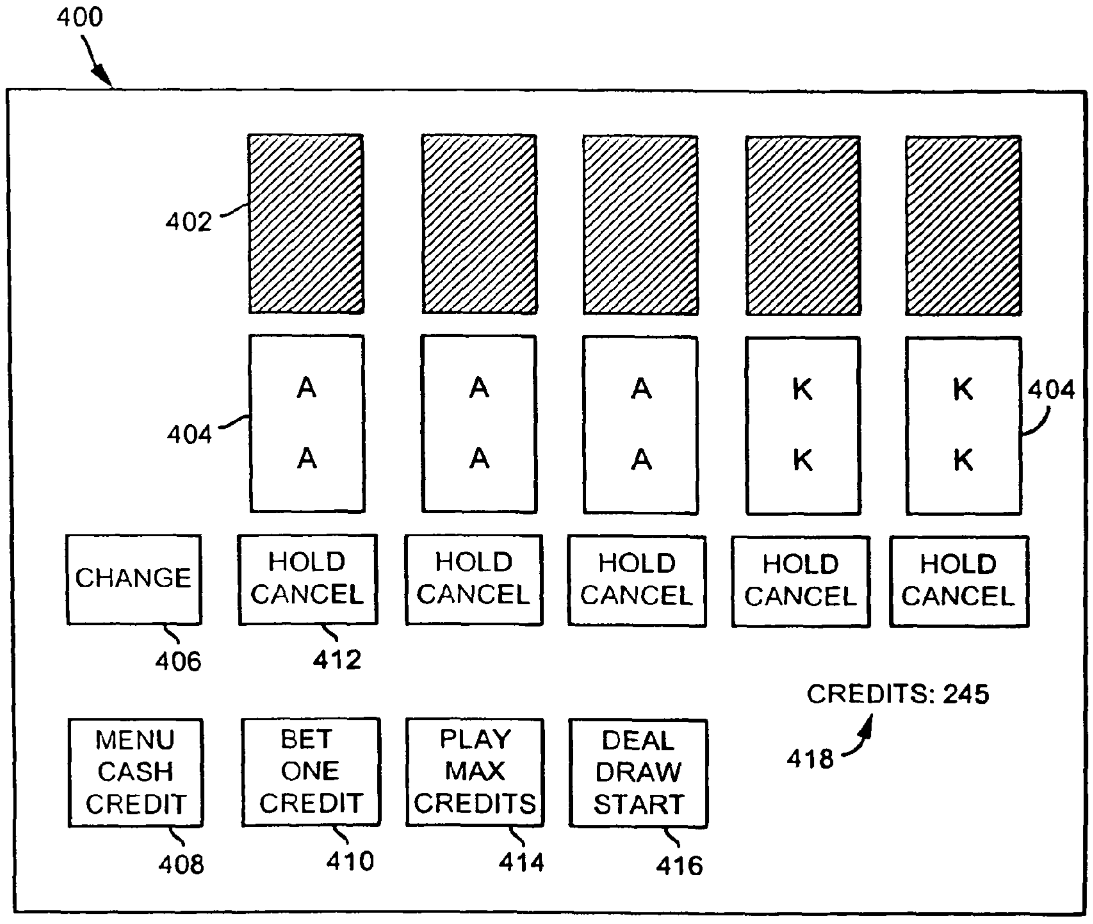
FIG. 12 is an illustration of a visual display that may be displayed when the controller of FIG. 9 performs the play video poker routine of FIG. 11.

FIG. 12 illustrates an exemplary display 400 that may be shown on the display unit 222 during performance of the video poker routine 310. Referring to FIG. 12, the display 400 may include video images representative of a plurality of cards 402 in a dealer's hand, which may be shown face down, and a plurality of cards 404 in a player's hand, which may be shown face up. To allow the player to control the play of the video poker game, a plurality of player-selectable button graphics may be displayed. For example, button graphics for change 406, menu/cash/credit 408 and bet one credit 410 may be displayed. Further, button graphics for hold/cancel 412 may be displayed, each of which may pertain to a particular one of the player's cards 404. Button graphics for play max credits 414 and deal/draw/start 416 may also be displayed. A graphic 418 representing the number of player credits may also be displayed to inform the player of the number of credits that he or she has remaining. The display 222 may comprise a touch-sensitive screen to allow the player to select any of the button graphics described above, by touching them with a finger, for example.

Video Blackjack

Figure 13:
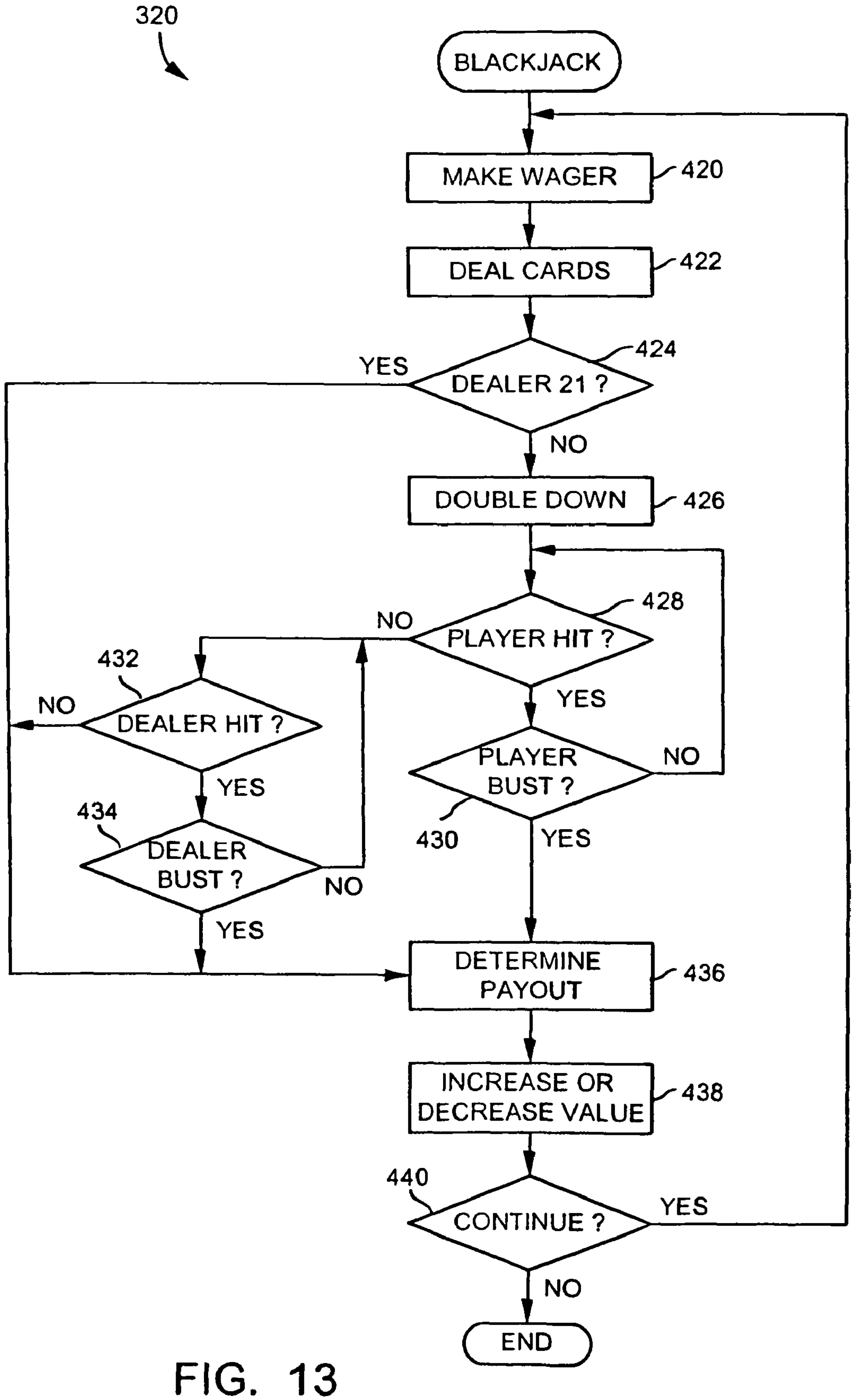
FIG. 13 is a flowchart of video blackjack routine that may be performed by the controller of FIG. 9.

FIG. 13 is a flowchart of the video blackjack routine 320 shown schematically in FIG. 10. Referring to FIG. 13, the video blackjack routine 320 may begin at block 420 at which a player may make a wager on the outcome of the blackjack game. After the player has made a wager, at block 422 the controller 260 may cause virtual cards to be "dealt" to both the player and the dealer (which may be the gambling unit 42), against which the player is playing.

After the cards are dealt, at block 424 the controller 260 may determine whether the dealer has a hand that totals 21. If the dealer's hand is not 21, at block 426 the controller 260 may cause the display unit 222 to generate a display asking whether the player would like to double down. At block 428, the controller 260 may allow the player to be "hit" (i.e. dealt an additional virtual card). If the player is hit, block 430 may determine if the player has "bust" (i.e. has exceeded 21). If the player has not bust, block 268 may be performed again to allow the player to be "hit" again.

If the player decides not to hit, at block 432 the controller 260 may determine whether the dealer wants to be hit. If the dealer hits, at block 434 the controller 260 may determine whether the dealer has bust. If the dealer has not bust, block 432 may be performed again to allow the dealer to be "hit" again. If the dealer decides not to hit, at block 436 the controller 260 may determine the outcome of the blackjack game and a corresponding payout. For example, the controller 260 may determine which of the player or the dealer has the higher hand that does not exceed 21.

At block 438, the controller 260 may increase or decrease the player's value based on the results of the blackjack game as determined at the block 436. At block 440, the controller 260 may cause a message to be displayed on the display unit 222 asking whether the player desires to continue playing the video blackjack game. If so, the routine may branch back to block 420. If not, the blackjack routine 320 may end and the controller 260 may cause block 360 of FIG. 10 to be performed.

Figure 14:
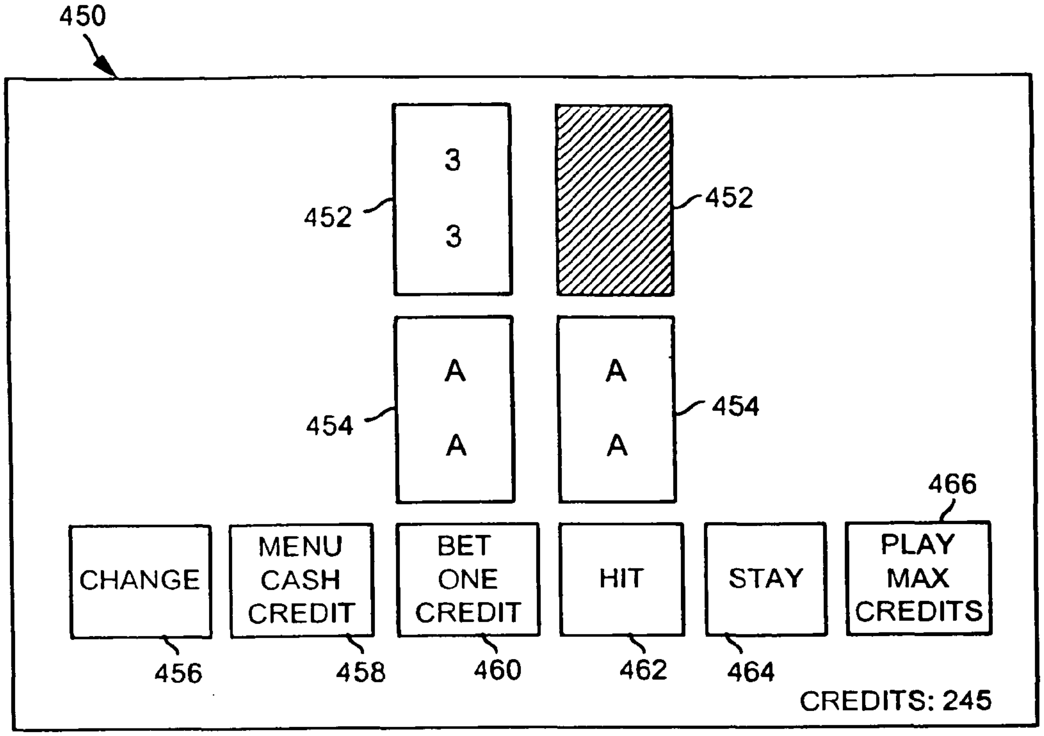
FIG. 14 is an illustration of a visual display that may be displayed when the controller of FIG. 9 performs the video blackjack routine of FIG. 13.

FIG. 14 illustrates an exemplary display 450 that may be shown on the display unit 222 during performance of the video blackjack routine 320. Referring to FIG. 14, the display 450 may include video images representative of a plurality of cards 452 that form a dealer's blackjack hand and a plurality of cards 454 that form the player's blackjack hand. To allow the player to control the play of the video blackjack game, a plurality of player-selectable button graphics may be displayed. For example, button graphics for change 456, menu/cash/credit 458, bet one credit 460, hit 462, stay 464 and/or play max credits 466 may be provided.

Video Slots

Figure 16:
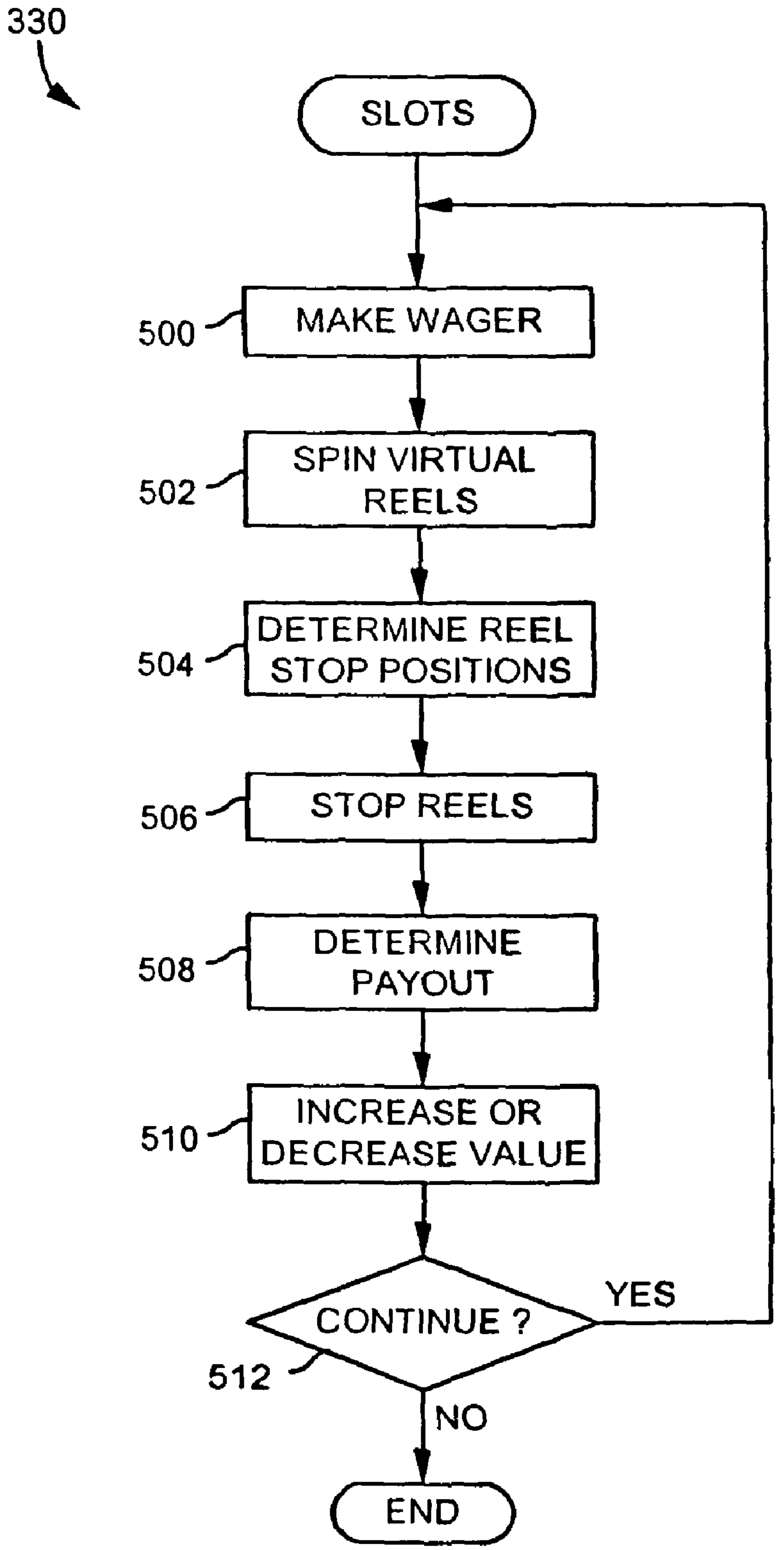
FIG. 16 is a flowchart of a video slots routine that may be performed by the controller of FIG. 9.

FIG. 16 is a flowchart of the video slots routine 330 shown schematically in FIG. 10. Referring to FIG. 16, the video slots routine 330 may begin at block 500 at which a player may make a wager. After the player has made a wager, at block 502 the controller 260 may cause an image of a plurality of spinning slot machine wheels to be generated on the display unit 222. While the virtual reels are spinning, at block 504 the controller 260 may determine the symbols on which the various virtual reels are to be stopped, such as by randomly selecting one or more numbers from which the reel stop positions are determined. At block 506, the controller 260 may cause the display unit 222 to display a sequence of images that simulate the sequential stopping of each of the virtual reels. The virtual reels may be stopped from left to right, from the perspective of the player, or in any other manner or sequence. At block 508, the controller 260 may evaluate the game outcome based on the positions at which the virtual reels stopped and determine the payout to which the player is entitled. For example, if a virtual reels have stopped on high payout symbols, the player may receive a large payout. If, however, the virtual reels have stopped on symbols having no payout, the player loses the money that was wagered at the block 500.

At block 510, the controller 260 may increase or decrease the player's value based on the results of the video slots game as determined at the block 508. At block 512, the controller 260 may cause a message to be displayed on the display unit 222 asking whether the player desires to continue playing the video slots game. If so, the routine may branch back to block 500. If not, the video slots routine 330 may end and the controller 260 may cause block 360 of FIG. 10 to be performed.

Figure 15:
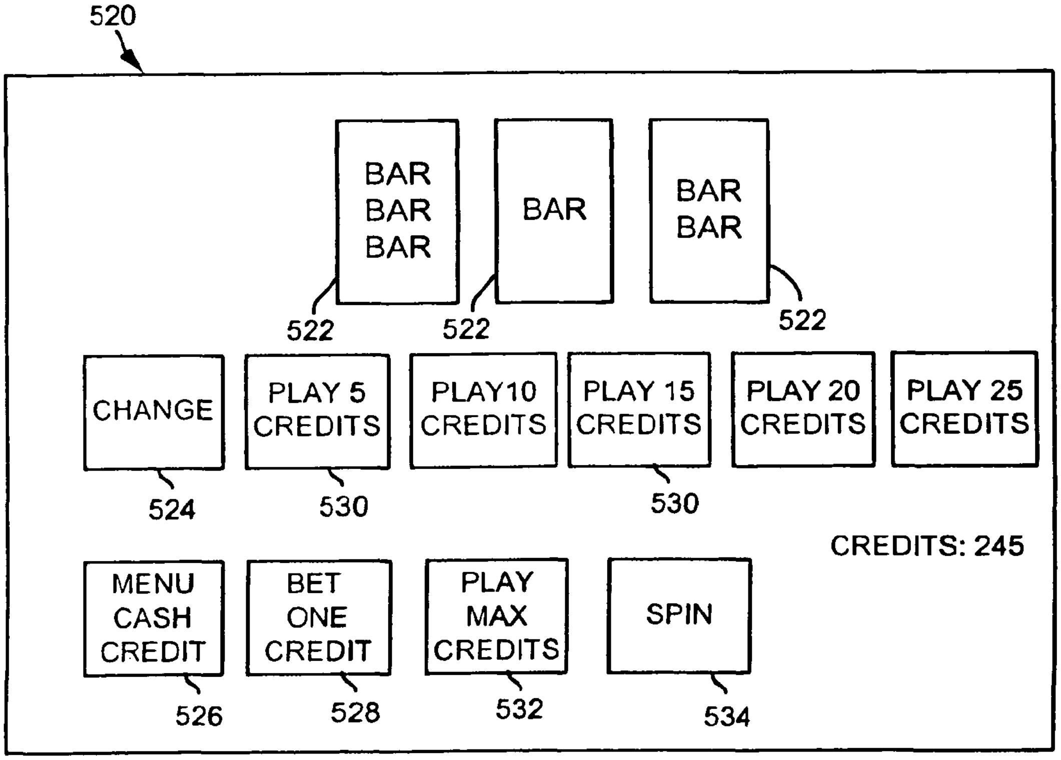
FIG. 15 is an illustration of a visual display that may be displayed when the controller of FIG. 9 performs the video slots routine of FIG. 16.

FIG. 15 illustrates an exemplary display 520 that may be shown on the display unit 222 during performance of the video slots routine 330. Referring to FIG. 15, the display 520 may include video images representative of a plurality of virtual slot machine reels 522. While three such virtual slot machine reels 522 are shown in FIG. 15, it should be understood that any number of virtual reels could be used. To allow the player to control the play of the video slot machine, a plurality of player-selectable button graphics may be displayed. For example, button graphics for change 524, menu/cash/credit 526, bet one credit 528, bet various numbers of credits 530, play max credits 532, and/or spin reels 534 may be displayed.

Video Keno

Figure 17:
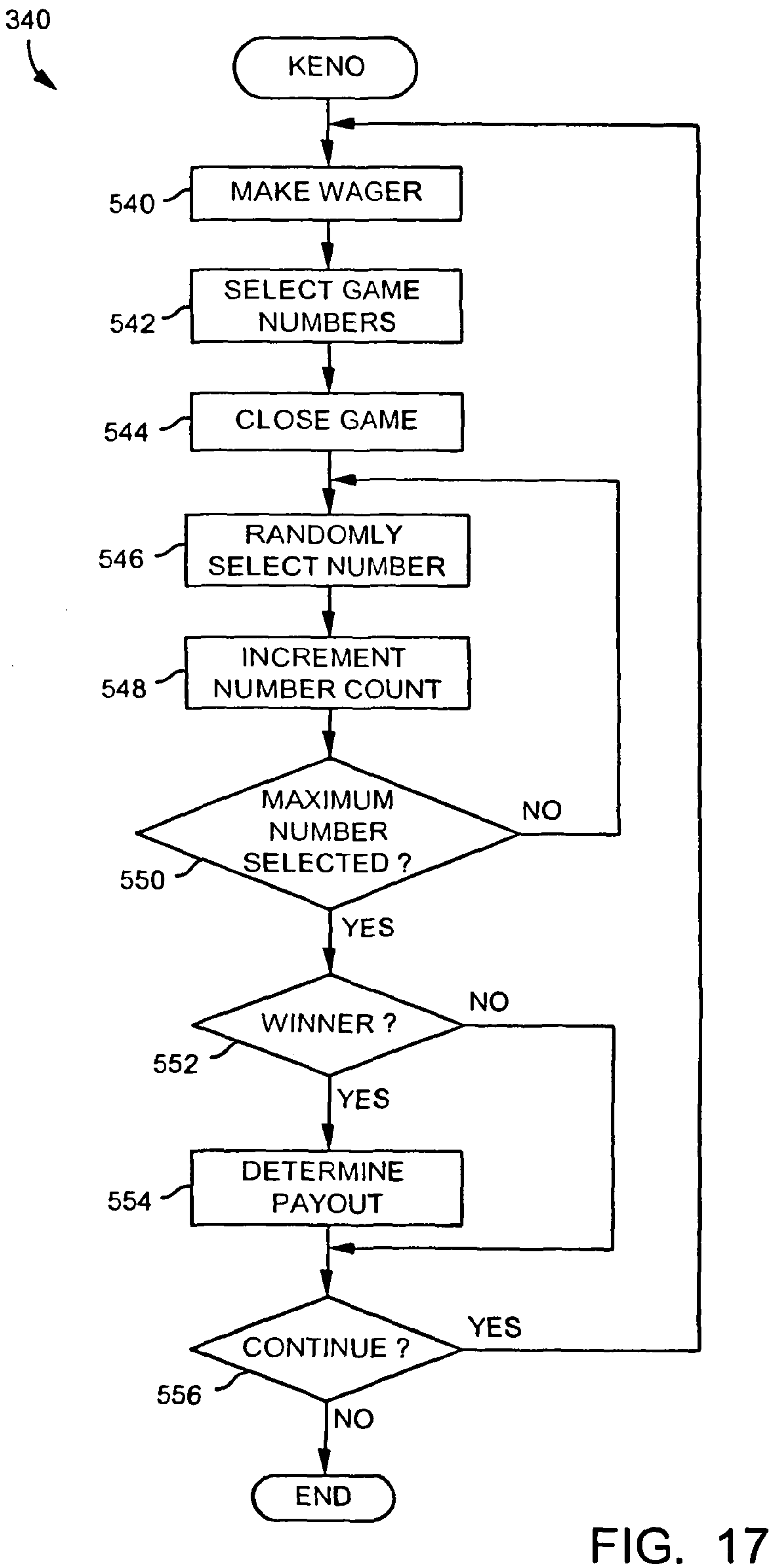
FIG. 17 is a flowchart of a video keno routine that may be performed by the controller of FIG. 9.

FIG. 17 is a flowchart of the video keno routine 340 shown schematically in FIG. 10. The keno routine 340 may be utilized in connection with a single gambling unit 42 where a single player is playing a keno game, or the keno routine 340 may be utilized in connection with multiple gambling units 42 where multiple players are playing a single keno game. In the latter case, one or more of the acts described below may be performed either by the controller 260 in each gambling unit or by a central computer (not shown) to which multiple gambling units 42 are operatively connected, such as by a network or other data link, for example.

Referring to FIG. 17, the video keno routine 340 may begin at block 540 at which a player makes a wager on the outcome of the keno game. After the player has made a wager, at block 542 the player may select one or more game numbers, which may be within a range set by the casino. After being selected, the player's game numbers may be stored in the memory of the controller 260.

At block 544, after a certain amount of time, the keno game may be closed to additional players (where a number of players are playing a single keno game using multiple gambling units 42) and/or additional game numbers for a single player. At block 546, a game number within a range set by the casino may be randomly selected either by the controller 260 or a central computer operatively connected to the controller. The randomly selected game number may be displayed on the display unit 222 and the display units 222 of other gambling units 42 (if any) which are involved in the same keno game. At block 548, the controller 260 (or the central computer noted above) may increment a count which keeps track of how many game numbers have been selected at block 546.

At block 550, the controller 260 (or the central computer noted above) may determine whether a maximum number of game numbers within the range have been randomly selected. If not, another game number may be randomly selected at block 546. If the maximum number of game numbers has been selected, at block 552 the controller 260 (or a central computer) may determine whether there are a sufficient number of matches between the game numbers selected by the player and the game numbers randomly selected at block 546 to cause the player to win. The number of matches may depend on how many numbers the player selected and the particular keno rules being used.

If there are a sufficient number of matches, a payout may be determined at block 554 to compensate the player for winning the game. The payout may depend on the number of matches between the game numbers selected by the player and the game numbers randomly selected at block 546. At block 556, the controller 260 may cause a message to be displayed on the display unit 222 asking whether the player desires to play another keno game. If so, the routine may branch back to block 540. If not, the keno routine 340 may end and the controller 260 may cause block 360 of FIG. 10 to be performed.

Figure 18:
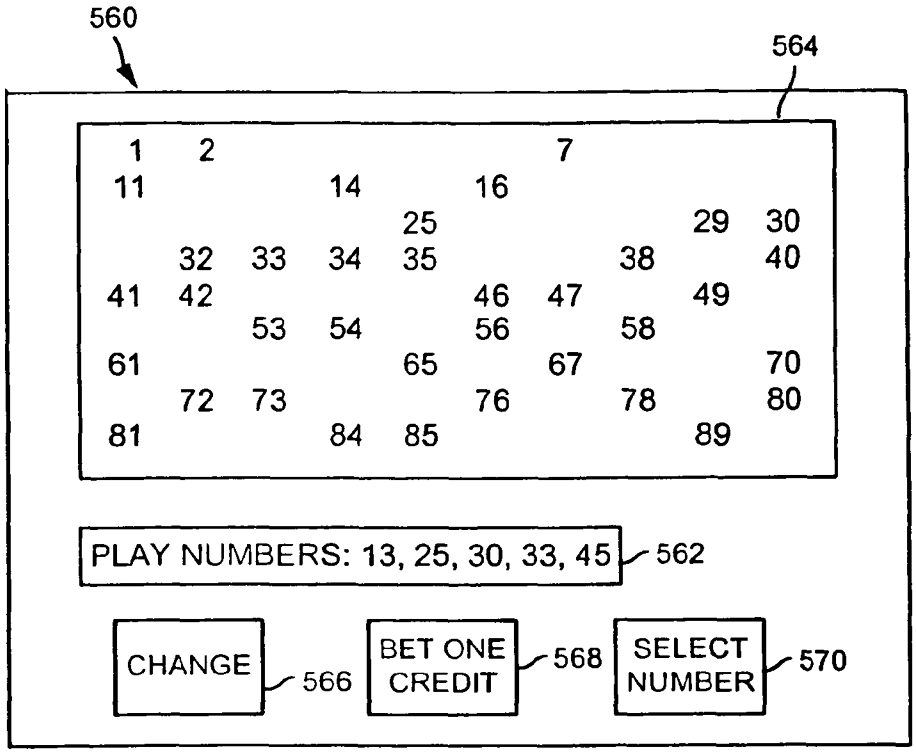
FIG. 18 is an illustration of a visual display that may be displayed when the controller of FIG. 9 performs the video keno routine of FIG. 17.

FIG. 18 illustrates an exemplary display 560 that may be shown on the display unit 222 during performance of the video keno routine 340. Referring to FIG. 18, the display 560 may include a video image 562 of a plurality of numbers that were selected by the player and a video image 564 of the randomly numbers randomly selected during the keno game. The randomly selected numbers may be displayed in a grid pattern. To allow the player to control the play of the keno game, a plurality of player-selectable button graphics may be displayed, such as a change graphic 566, a bet-one-credit graphic 568, and a select number graphic 570.

Video Bingo

Figure 20:
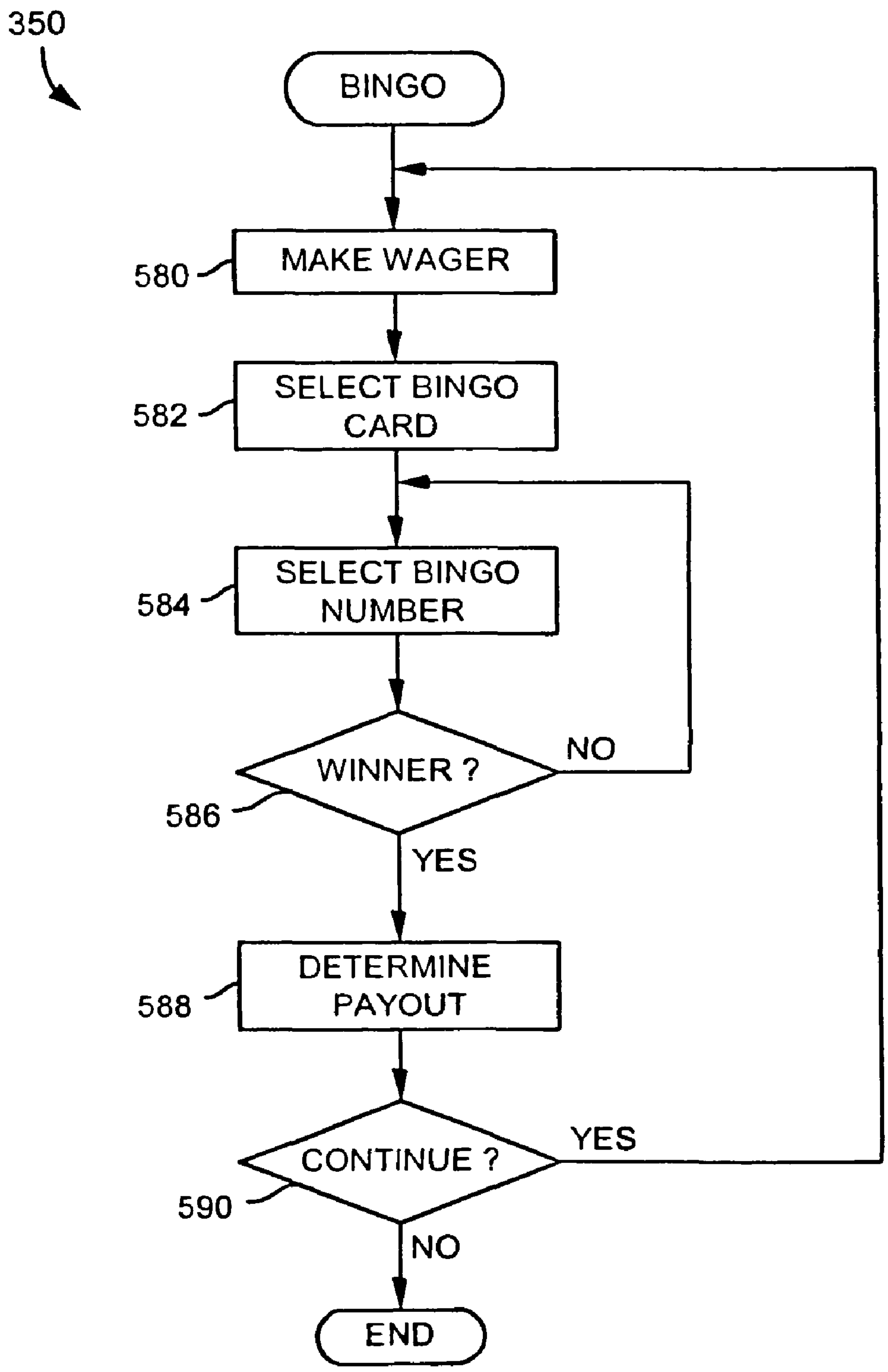
FIG. 20 is a flowchart of a video bingo routine that may be performed by the controller of FIG. 9.

FIG. 20 is a flowchart of the video bingo routine 350 shown schematically in FIG. 10. The bingo routine 350 may be utilized in connection with a single gambling unit 42 where a single player is playing a bingo game, or the bingo routine 350 may be utilized in connection with multiple gambling units 42 where multiple players are playing a single bingo game. In the latter case, one or more of the acts described below may be performed either by the controller 260 in each gambling unit 42 or by a central computer (not shown) to which multiple gambling units 42 are operatively connected, such as by a network or other data link, for example.

Figure 19:
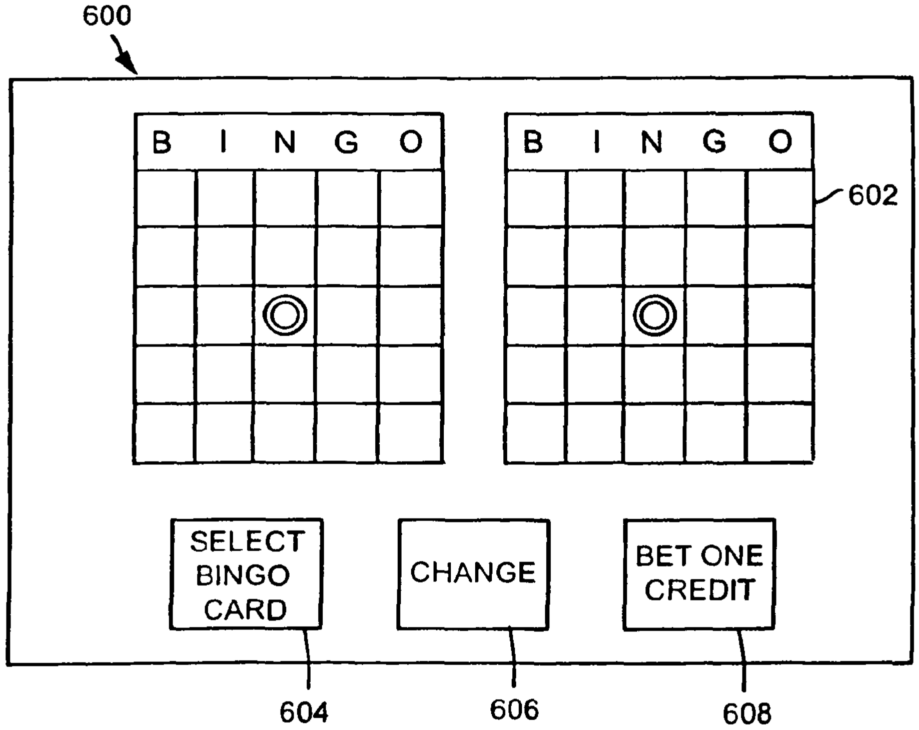
FIG. 19 is an illustration of a visual display that may be displayed when the controller of FIG. 9 performs the video bingo routine of FIG. 20.

Referring to FIG. 19, at block 580 the controller 260 may prompt a player to make a wager on the outcome of the bingo game by causing a message to be displayed on the display unit 222. At block 582, the player may select a bingo card, which may be generated randomly. The player may select more than one bingo card, and there may be a maximum number of bingo cards that a player may select. At block 584, a bingo number may be randomly generated by the controller 260 or a central computer. The bingo number may be communicated to the display unit 222 and to the display units 222 of any other gambling units 42 involved in the bingo game.

At block 586, the controller 260 (or a central computer) may determine whether the player has won according to any set of bingo rules. If no player has won, another bingo number may be randomly selected at block 584. At block 586, if a player has bingo (which may be determined by the controller 260), at block 588 a payout for the winning player may be determined. The payout may depend on the number of random numbers that were drawn before there was a winner, the total number of winners (if there was more than one player), and the amount of money that was wagered on the game.

FIG. 19 illustrates an exemplary display 600 that may be shown on the display unit 222 during performance of the video bingo routine 350. Referring to in FIG. 20, the display 600 may include a video image 602 of one or more bingo cards and images of the bingo numbers selected during the game. The bingo cards may have a grid pattern. To allow the player to control the play of the video bingo game, a plurality of user-selectable button graphics may be displayed, such as a select bingo card graphic 604, a change graphic 606, and/or a bet one credit graphic 608.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A casino gambling system comprising:

a biometric input apparatus capable of generating digital data representing a unique physical characteristic of a person;

a cashier controller operatively coupled to said biometric input apparatus, said cashier controller comprising a microprocessor and a memory, said cashier controller programmed to:

store a first set of digital data derived from the biometric input apparatus in response to a person presenting a unique physical characteristic to the biometric input apparatus at a first time;

store a second set of digital data derived from the biometric input apparatus in response to the person presenting the unique physical characteristic to the biometric input device at a second time;

determine whether the biometric input apparatus has made a predetermined number of scans of the same physical characteristic of the person, wherein the first and second sets of digital data comprise pixels that correspond to images of the unique physical characteristic; and generate a set of composite digital data by determining an average pixel intensity on a pixel-by-pixel basis of the pixels in the first set of digital data and the pixels in the second set of digital data when at least the predetermined number of scans has been made.

2. A casino gambling system as defined in claim 1 wherein said biometric input apparatus comprises a fingerprint scanner.

3. A casino gambling system as defined in claim 1 wherein said biometric input apparatus comprises an eye scanner.

4. A casino gambling system as defined in claim 1 wherein said biometric input apparatus comprises a camera.

5. A casino gambling system as defined in claim 1 wherein said biometric input apparatus comprises a microphone.

6. A casino gambling system as defined in claim 1, wherein said cashier controller is programmed to control access to said cashier computer.

7. A casino gambling system as defined in claim 6, wherein said cashier controller is programmed to control access to said cashier computer by verifying the identity of the person based upon the composite digital data.

8. A casino gambling system as defined in claim 1, wherein said cashier controller is programmed to:

cause a first prompt to the person to be generated to cause the person to present a unique physical characteristic of the person to said biometric input apparatus at a first time; and cause a second prompt to the person to be generated to cause the person to present the same unique physical characteristic of the person.

9. A cashier computer comprising:

a biometric input apparatus capable of generating digital data representing a unique physical characteristic of a person; and a cashier controller operatively coupled to said biometric input apparatus, said cashier controller comprising a microprocessor and a memory, said cashier controller programmed to:

store a first set of digital data derived from the biometric input apparatus in response to the person presenting a unique physical characteristic to the biometric input apparatus at a first time;

store a second set of digital data derived from the biometric input apparatus in response to the person presenting the unique physical characteristic to the biometric input device at a second time;

determine whether the biometric input apparatus has made a predetermined number of scans of the same physical characteristic of the person, wherein the first and second sets of digital data comprise pixels that correspond to images of the unique physical characteristic; and generate a set of composite digital data by determining an average pixel intensity on a pixel-by-pixel basis of the pixels in the first set of digital data and the pixels in the second set of digital data when at least the predetermined number of scans has been made.

10. A cashier computer as defined in claim 9 wherein said biometric input apparatus comprises a fingerprint scanner.

11. A cashier computer as defined in claim 9 wherein said biometric input apparatus comprises an eye scanner.

12. A cashier computer as defined in claim 9 wherein said biometric input apparatus comprises a camera.

13. A cashier computer as defined in claim 9 wherein said biometric input apparatus comprises a microphone.

14. A cashier computer as defined in claim 9, wherein said cashier controller is programmed to control access to said cashier computer based upon said composite digital data.

15. A cashier computer as defined in claim 14, wherein said cashier controller is programmed to control access to said cashier computer by verifying the identity of the person based upon said composite digital data.

16. A cashier computer as defined in claim 9, wherein said cashier controller is programmed to:

cause a first prompt to the person to be generated to cause the person to present a unique physical characteristic of the person to said biometric input apparatus at a first time; and cause a second prompt to the person to be generated to cause the person to present the same unique physical characteristic of the person.

17. A cashier computer comprising:

a biometric input apparatus capable of generating digital data representing a unique physical characteristic of a person; and a cashier controller operatively coupled to said biometric input apparatus, said cashier controller comprising a microprocessor and a memory, said cashier controller programmed to:

store a first set of digital data derived from the biometric input apparatus in response to the person presenting a unique physical characteristic to the biometric input apparatus at a first time;

store a second set of digital data derived from the biometric input apparatus in response to the person presenting the unique physical characteristic to the biometric input device at a second time;

determine whether the biometric input apparatus has made a predetermined number of scans of the same physical characteristic of the person, wherein the first and second sets of digital data comprise pixels that correspond to images of the unique physical characteristic; and generate a set of composite digital data by determining an average pixel intensity on a pixel-by-pixel basis of the pixels in the first set of digital data and the pixels in the second set of digital data when at least the predetermined number of scans has been made, wherein said cashier controller is programmed to control access to said cashier computer by verifying the identity of the person based upon the composite digital data.

* * * * *